US009716643B2

(12) United States Patent
Chan et al.

(10) Patent No.: US 9,716,643 B2
(45) Date of Patent: Jul. 25, 2017

(54) SYSTEMS AND METHODS FOR CHANGING THE FREQUENCY OF RETRIEVING MONITORING DATA

(71) Applicant: Pismo Labs Technology Limited, Hong Kong (HK)

(72) Inventors: Ho Ming Chan, Hong Kong (HK); Ying Kwan, Hong Kong (HK); Ki Tak Cheuk, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 259 days.

(21) Appl. No.: 14/410,103

(22) PCT Filed: Jul. 31, 2014

(86) PCT No.: PCT/IB2014/063582
§ 371 (c)(1),
(2) Date: Dec. 21, 2014

(87) PCT Pub. No.: WO2016/016690
PCT Pub. Date: Feb. 4, 2016

(65) Prior Publication Data
US 2016/0277277 A1    Sep. 22, 2016

(51) Int. Cl.
*H04L 12/26* (2006.01)
*H04L 12/24* (2006.01)
*H04W 24/08* (2009.01)

(52) U.S. Cl.
CPC ........ *H04L 43/103* (2013.01); *H04L 41/0806* (2013.01); *H04L 41/0816* (2013.01); *H04L 43/045* (2013.01); *H04W 24/08* (2013.01)

(58) Field of Classification Search
CPC . H04L 43/103; H04L 43/045; H04L 41/0816; H04L 41/0806
See application file for complete search history.

(56) References Cited

U.S. PATENT DOCUMENTS 8,655,379 B2 * 2/2014 Meadows ............... H04W 4/02
340/539.1
2009/0296572 A1* 12/2009 Xiong ................. H04L 12/5695
370/228
(Continued)

FOREIGN PATENT DOCUMENTS

EP         2365719 A1    9/2011
JP      2004240876 A    8/2004
(Continued)

OTHER PUBLICATIONS

International Search Report in International Application No. PCT/IB2014/063582, mailed on Apr. 28, 2015.
(Continued)

*Primary Examiner* — Dustin Nguyen
*Assistant Examiner* — Matthew Ballard

(57) ABSTRACT

The present invention discloses methods and systems for monitoring a network connected device by a monitoring server. The monitoring server sends notifications to the network connected device periodically according to a time interval. The time interval is set to a normal value and the notifications include a request for the monitoring data. Then the network connected device sends the monitoring data to monitoring server upon receiving the notifications. Monitoring server receives and stores the monitoring data from the network connected device. When one condition is satisfied, the time interval is changed to a lower value. Therefore, the frequency of sending notifications to network connected device from monitoring server is changed.

20 Claims, 20 Drawing Sheets

(56) References Cited

U.S. PATENT DOCUMENTS

| | | | | |
|---|---|---|---|---|
| 2010/0094930 A1* | 4/2010 | Griff | .................... | H04W 24/10 |
| | | | | 709/203 |
| 2011/0279228 A1* | 11/2011 | Kumar | .................... | G09B 7/00 |
| | | | | 340/5.83 |
| 2012/0131095 A1* | 5/2012 | Luna | ...................... | H04L 67/04 |
| | | | | 709/203 |

FOREIGN PATENT DOCUMENTS

| KR | 20060064393 A | 6/2006 |
|---|---|---|
| KR | 1007742 B1 | 1/2011 |

OTHER PUBLICATIONS

Written Opinion of the international Searching Authority in International Application No. PCT/IB2014/063582, mailed on Apr. 28, 2015.

\* cited by examiner

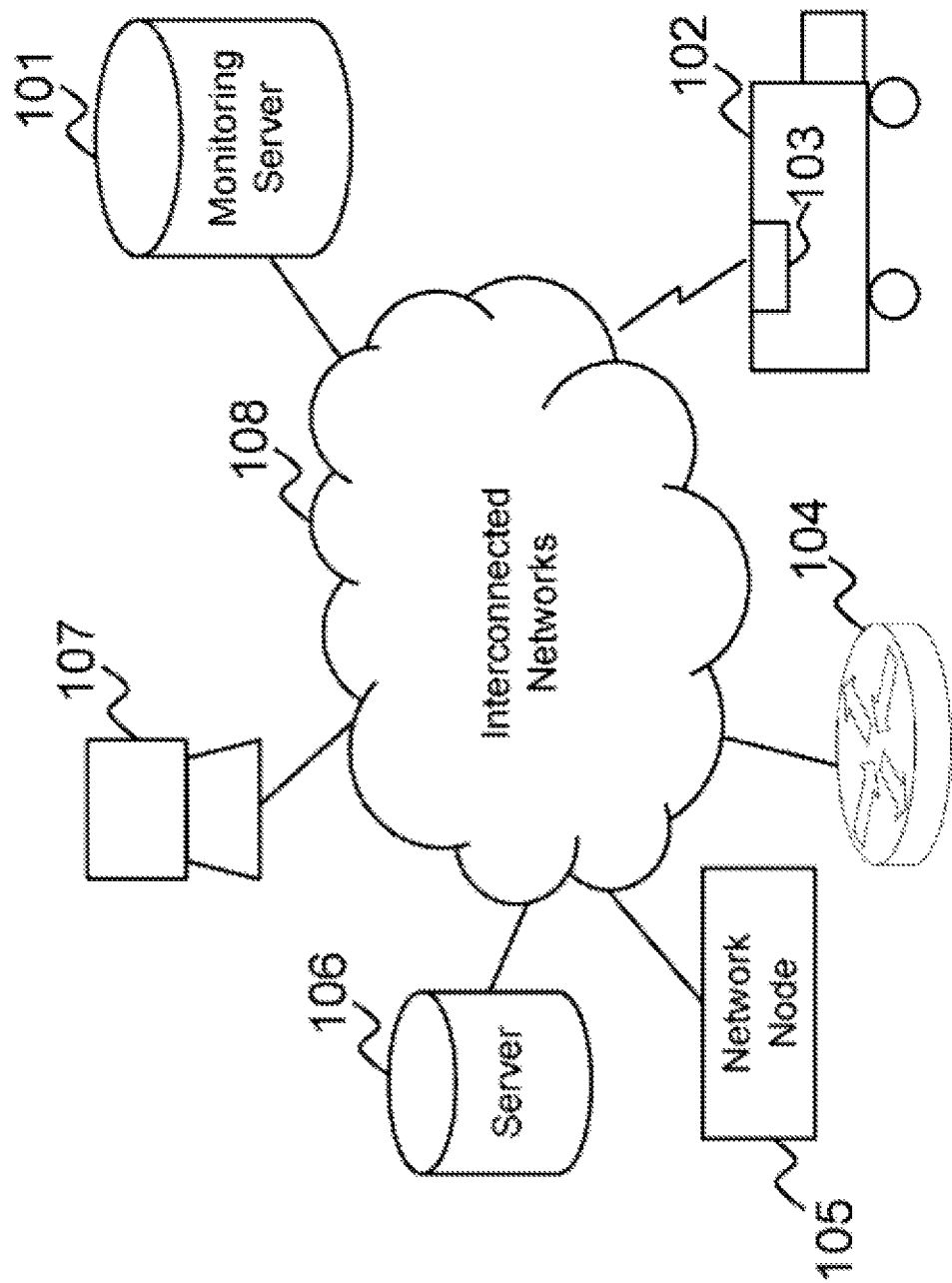

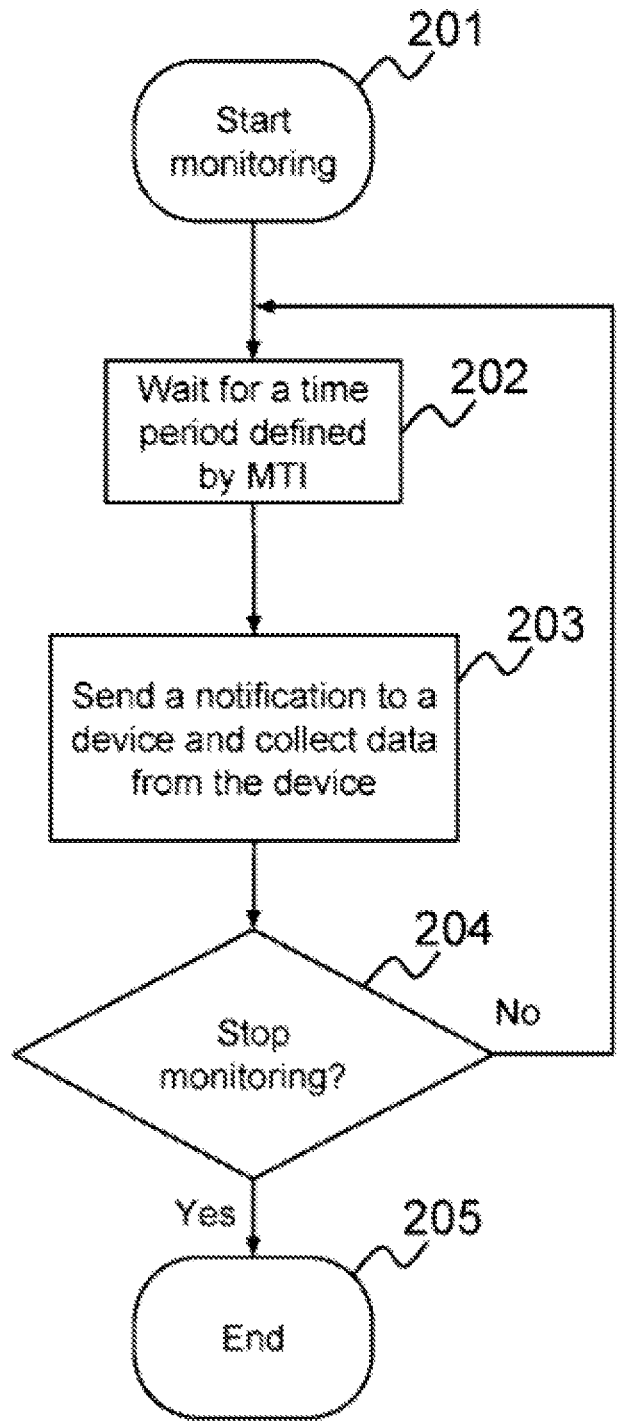
[Fig. 2]

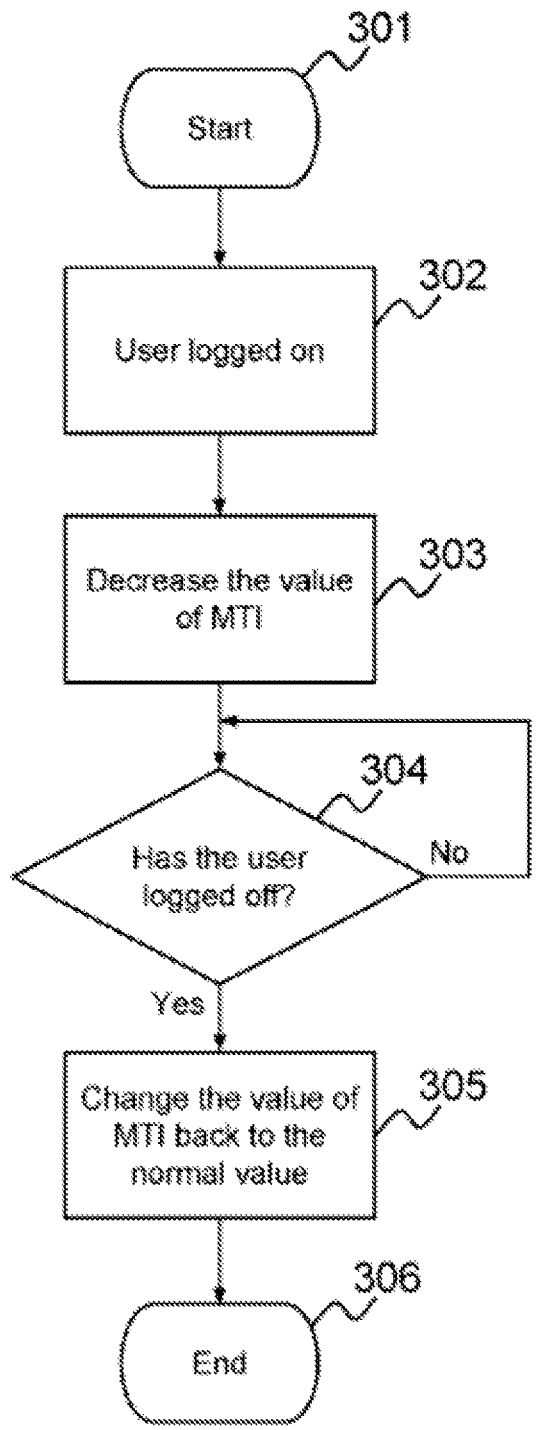
[Fig. 3A]

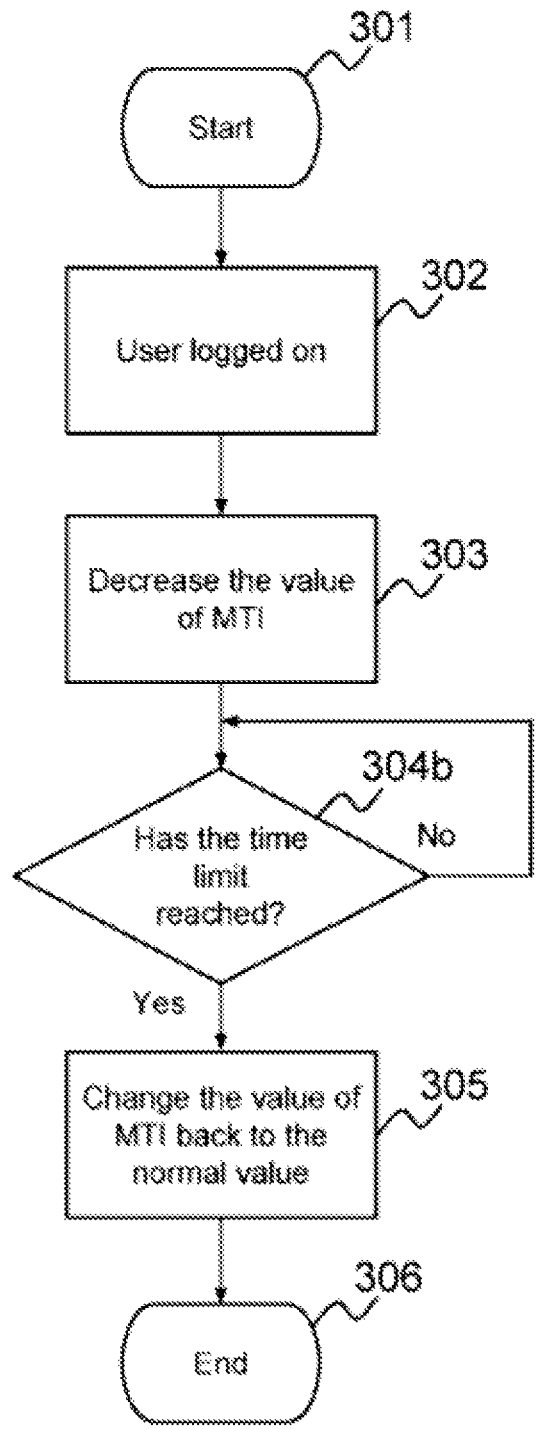
[Fig. 3B]

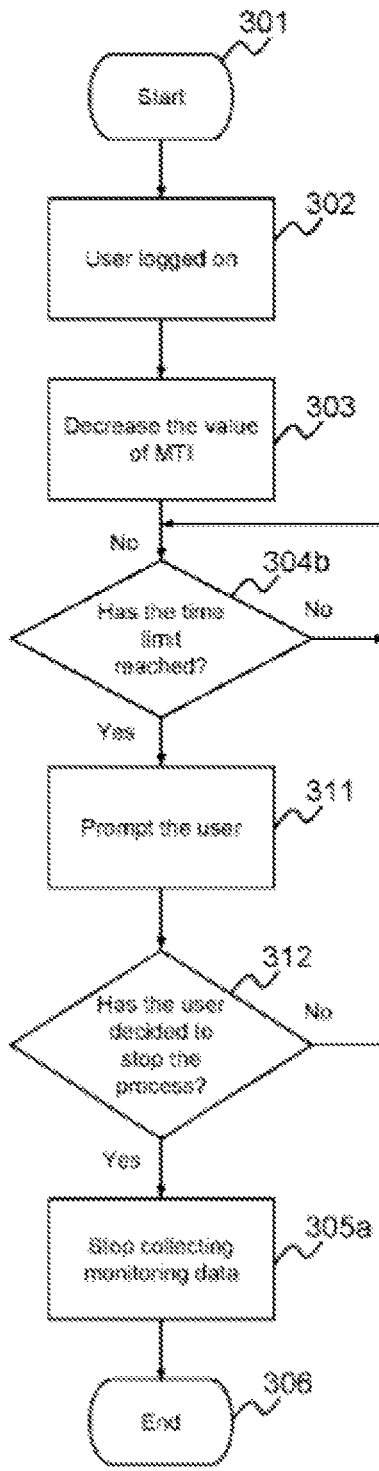
[Fig. 3C]

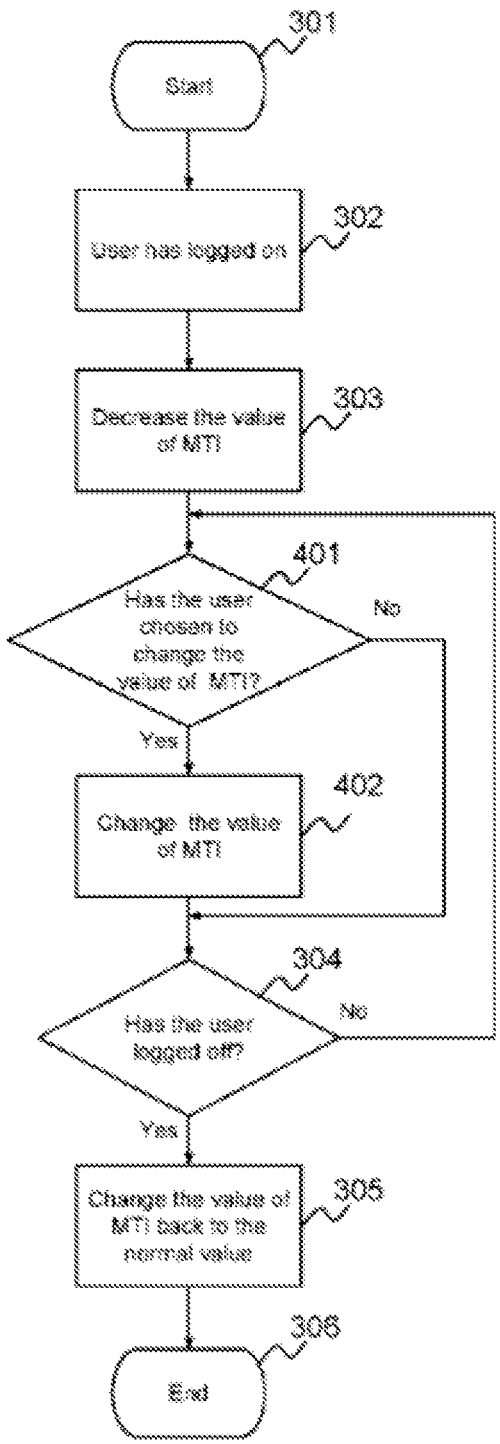
[Fig. 4]

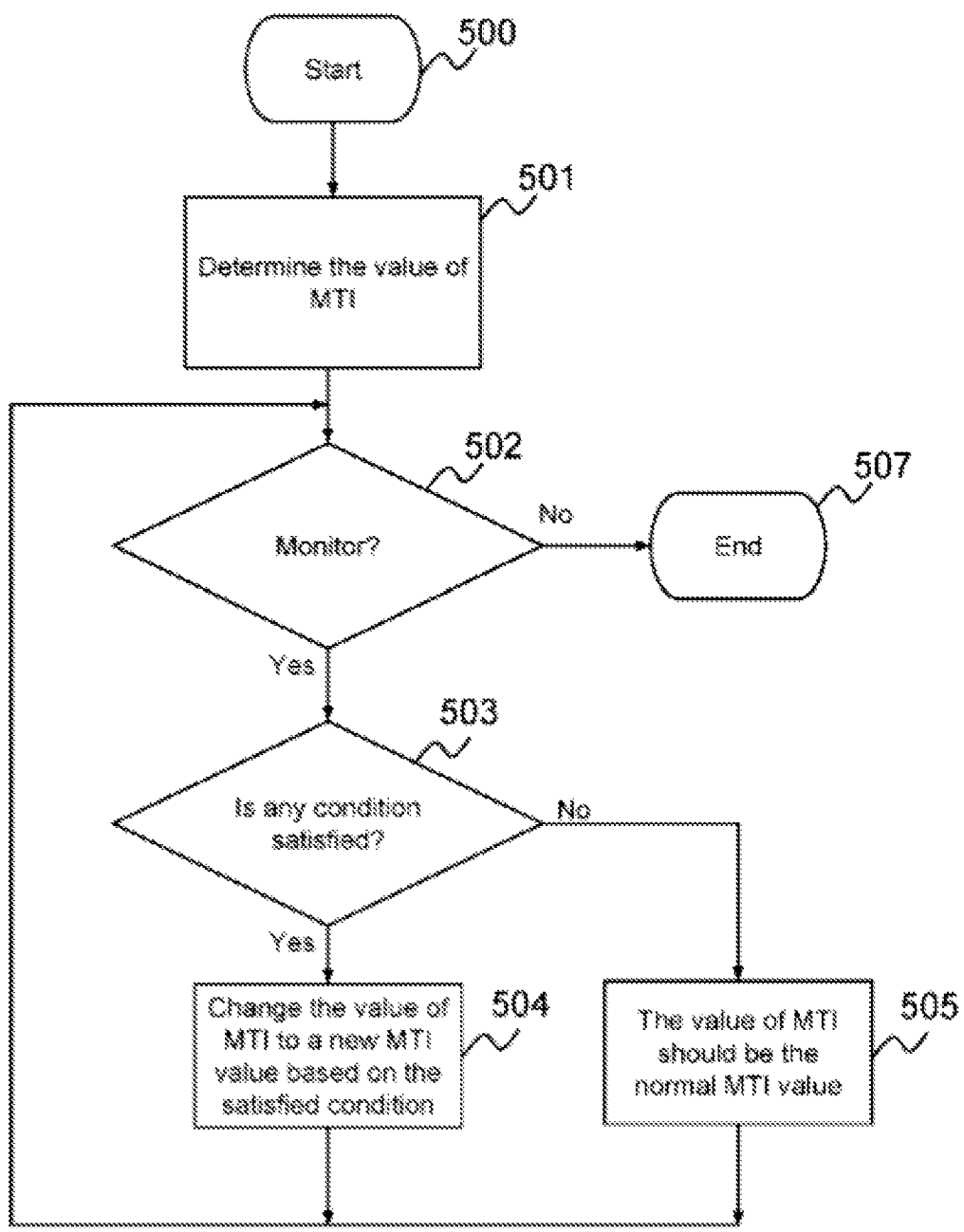
[Fig. 5]

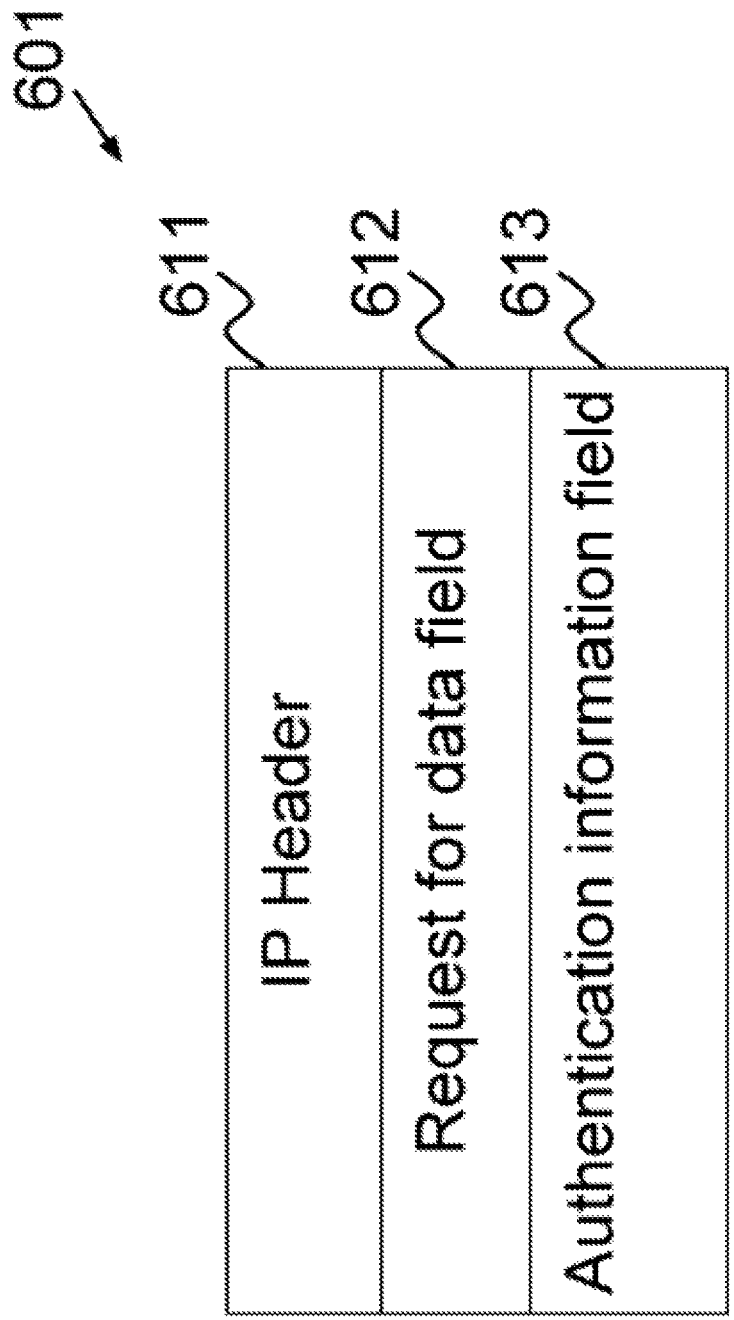
[Fig. 6A]

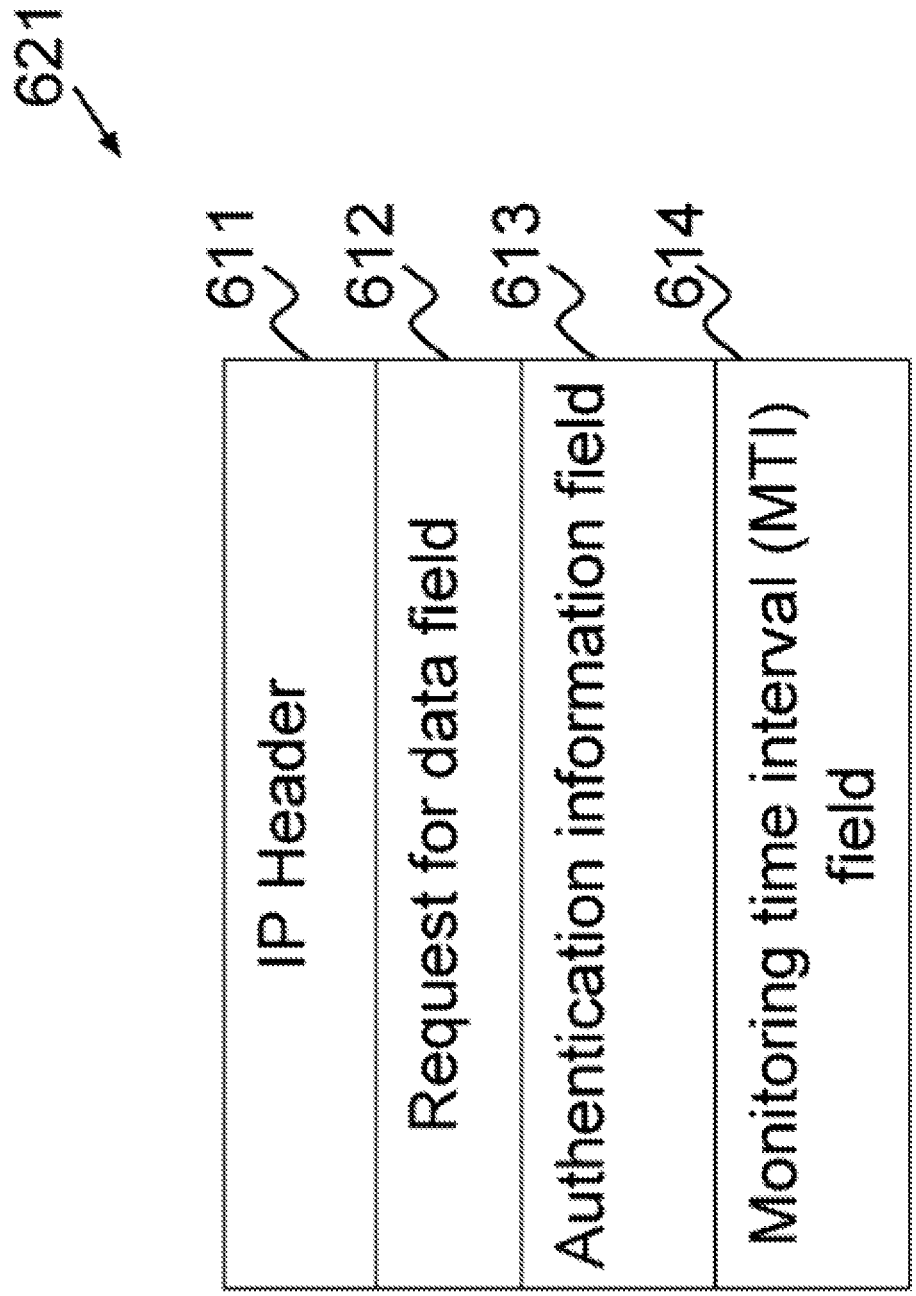
[Fig. 6B]

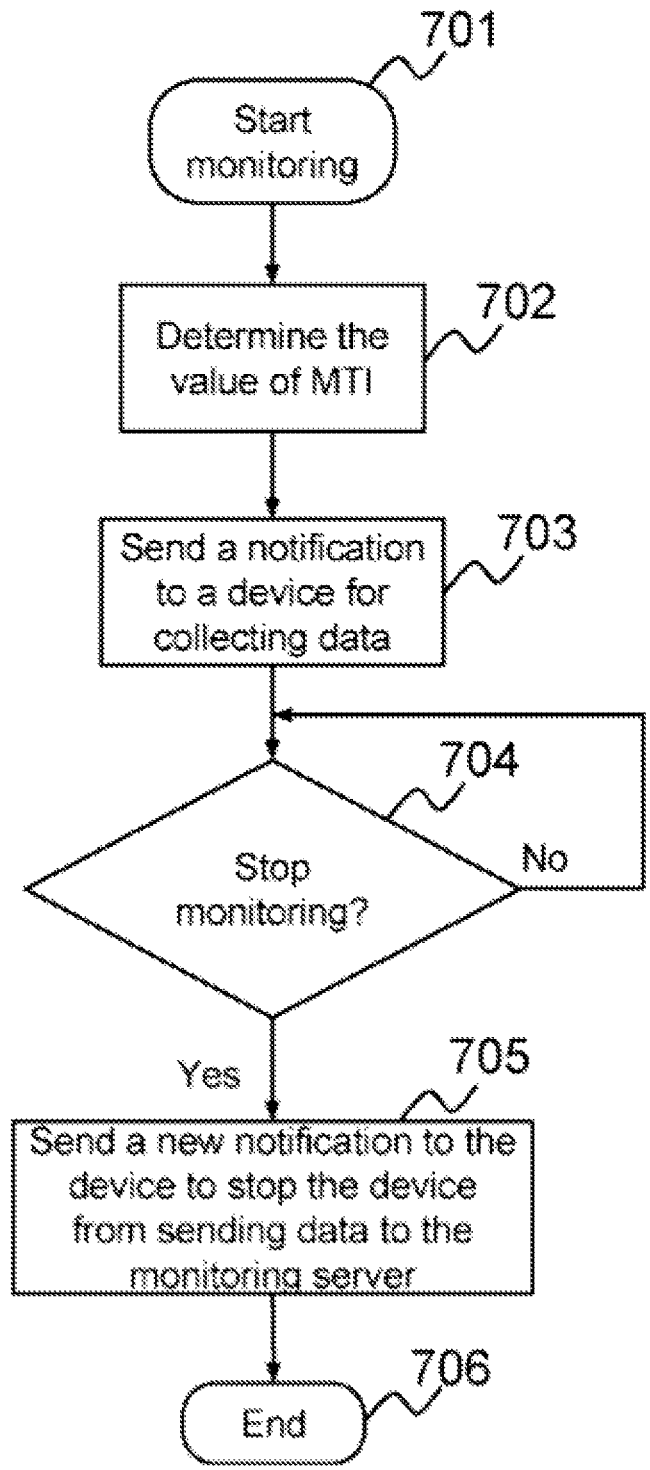
[Fig. 7A]

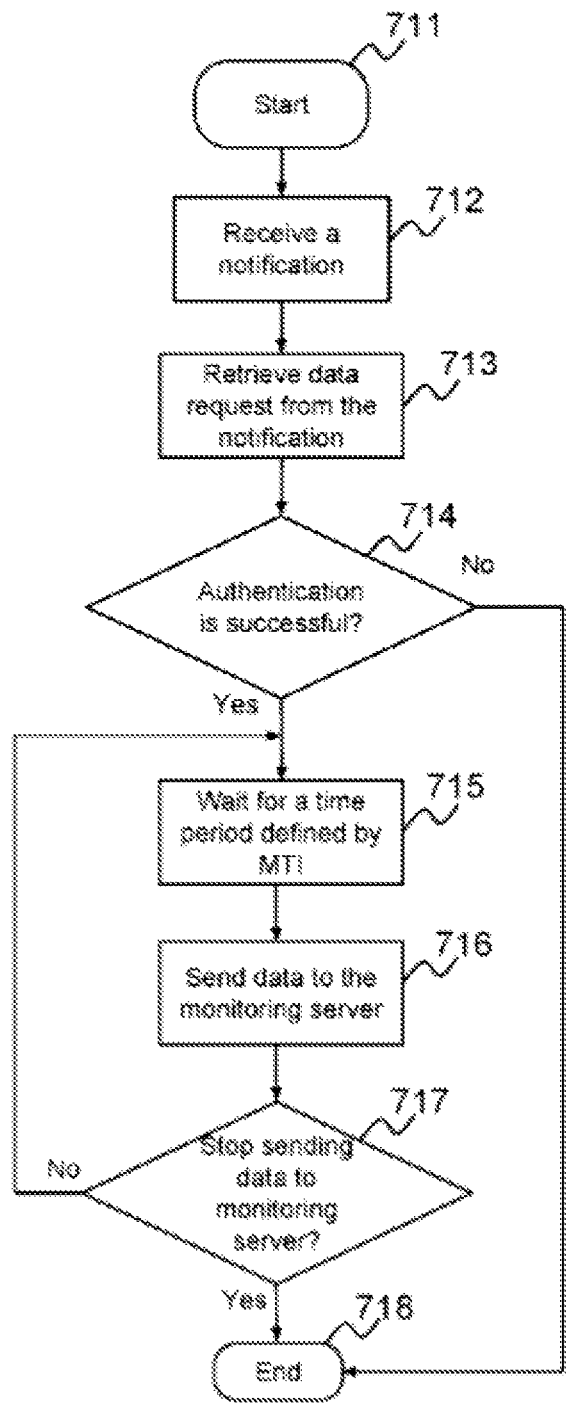
[Fig. 7B]

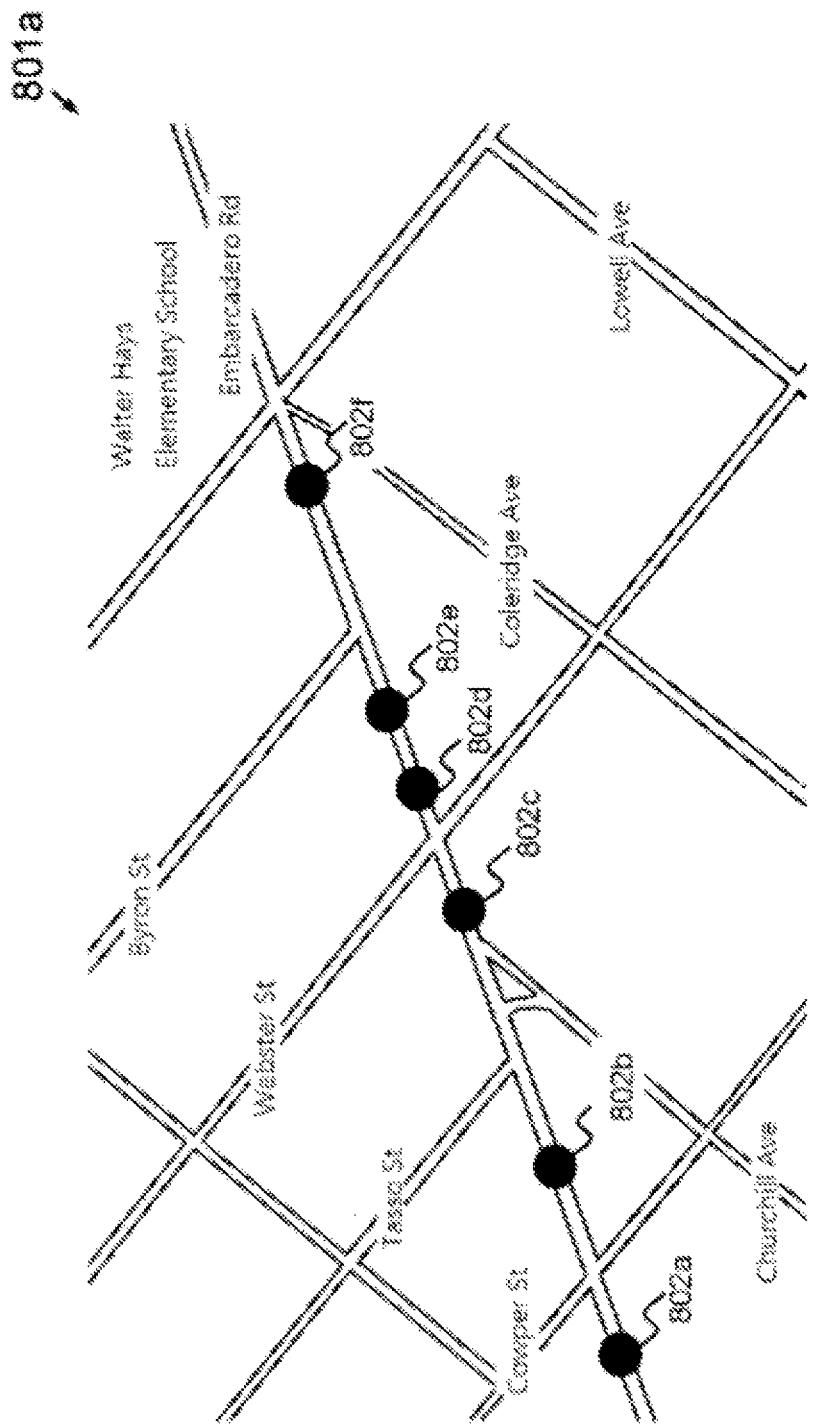
[Fig. 8A]

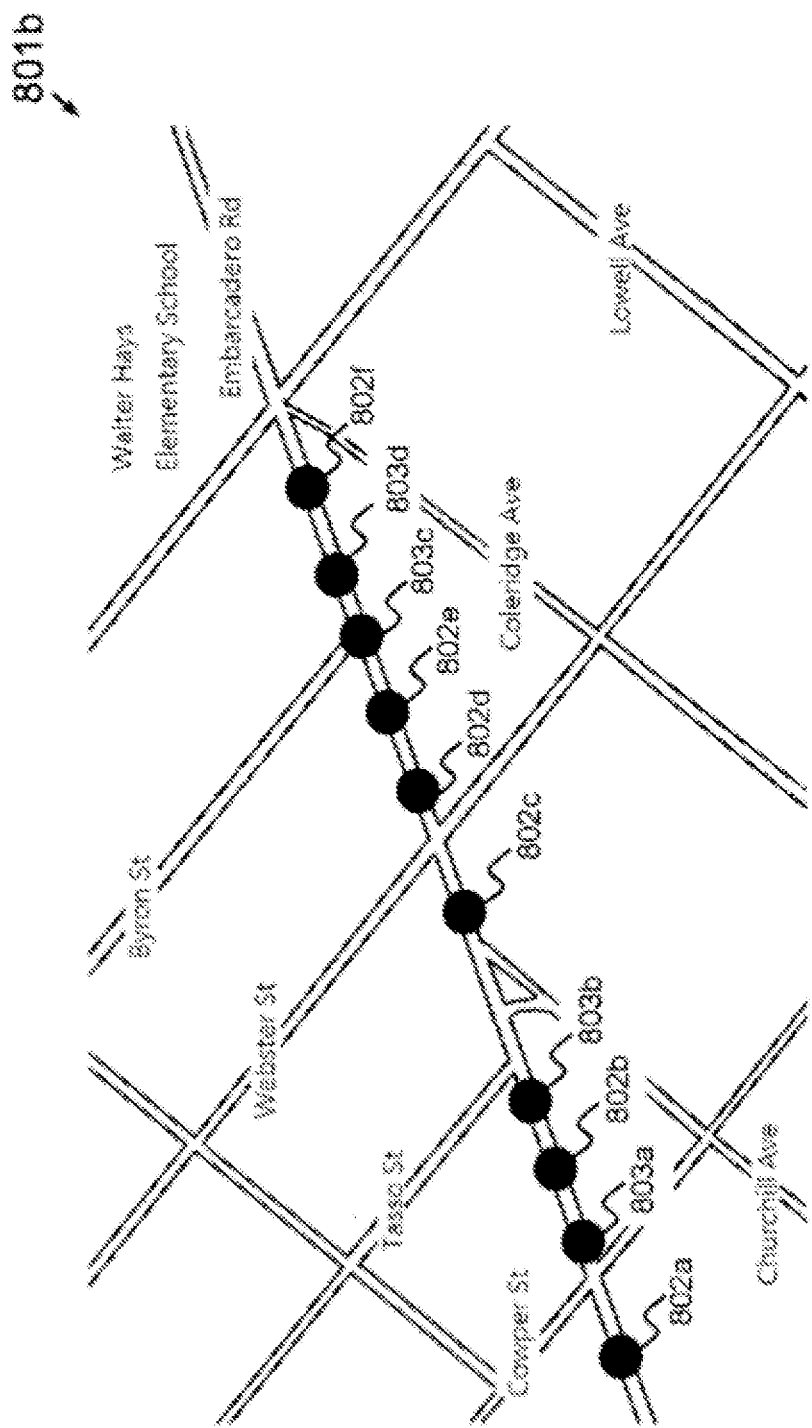
[Fig. 8B]

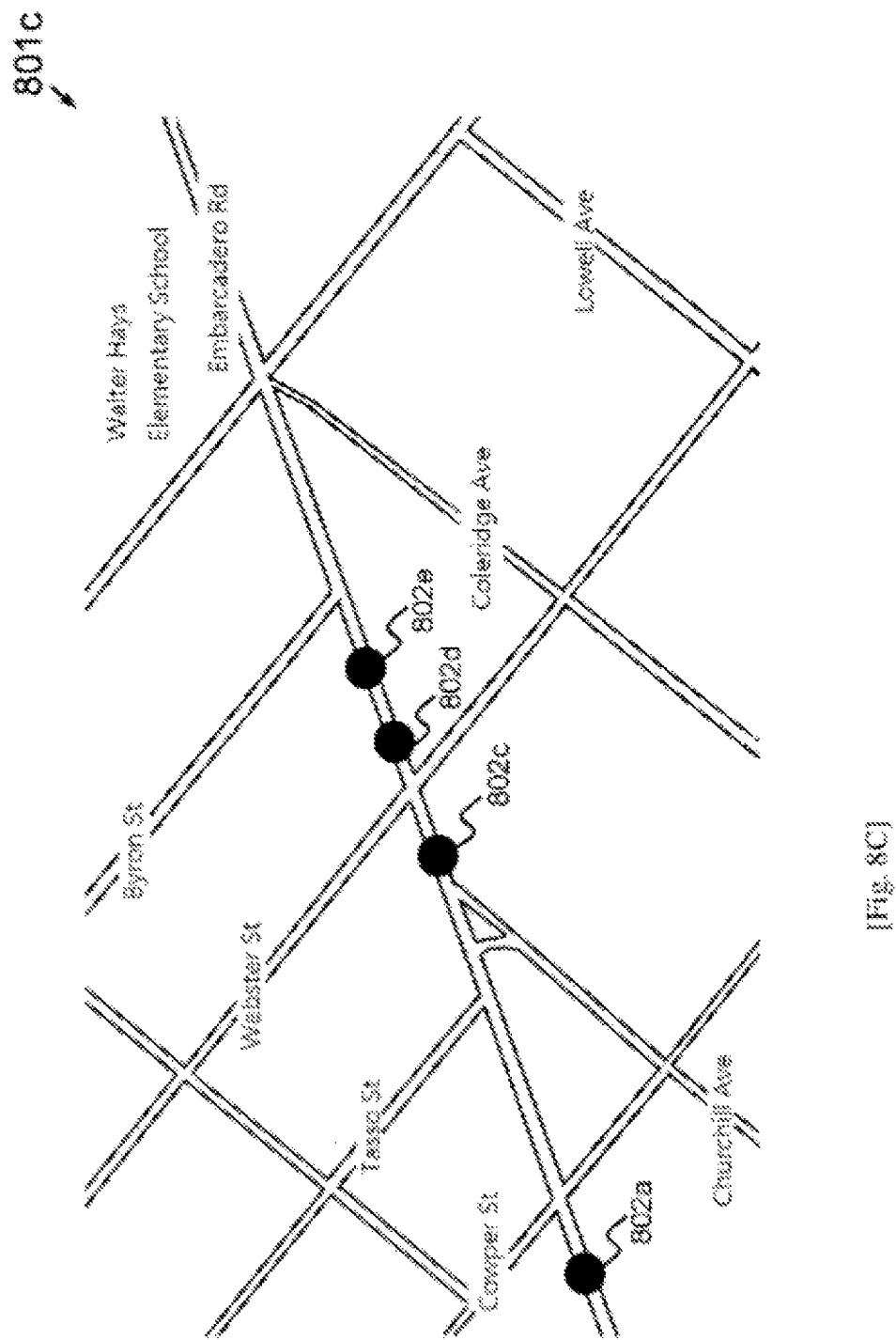

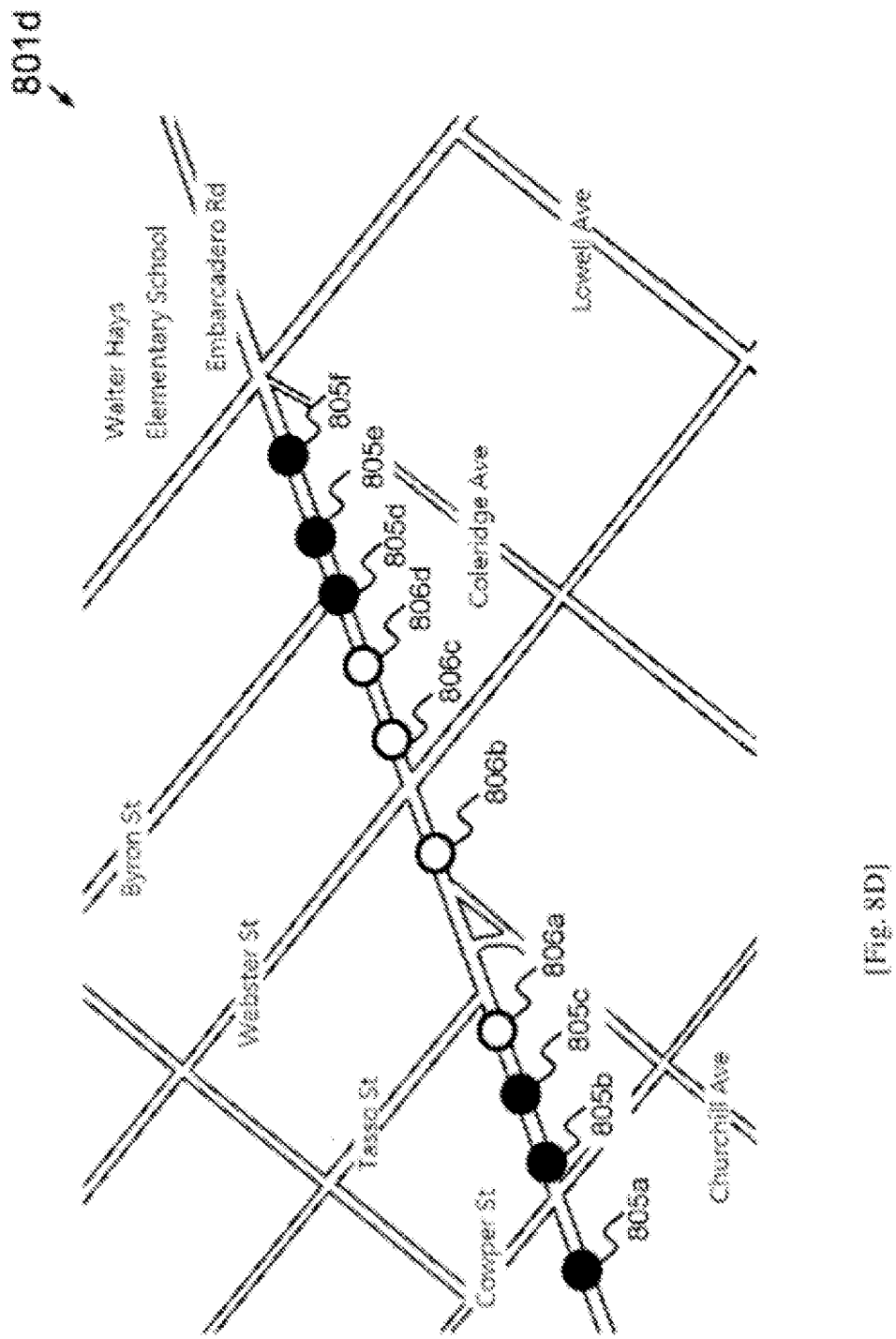

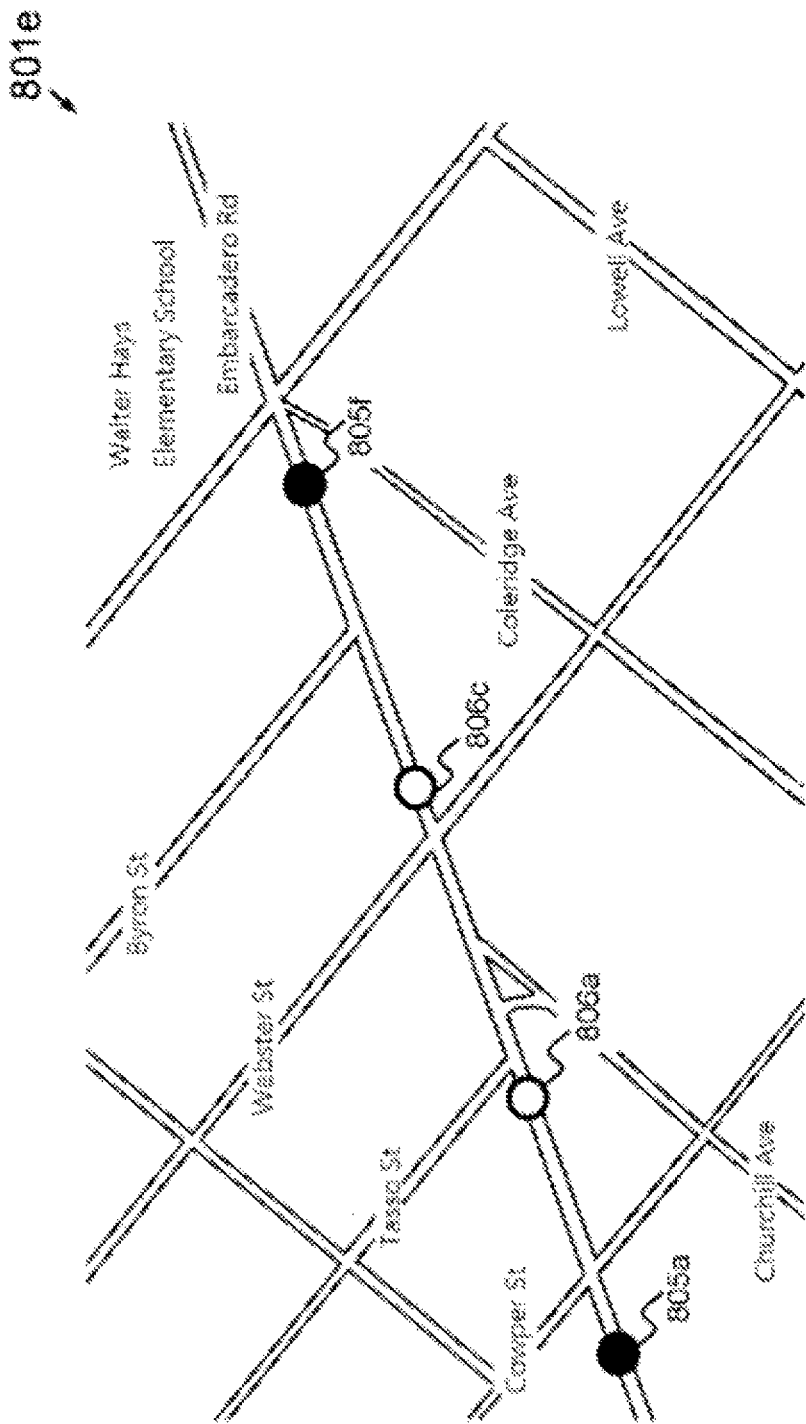
[Fig. 8E]

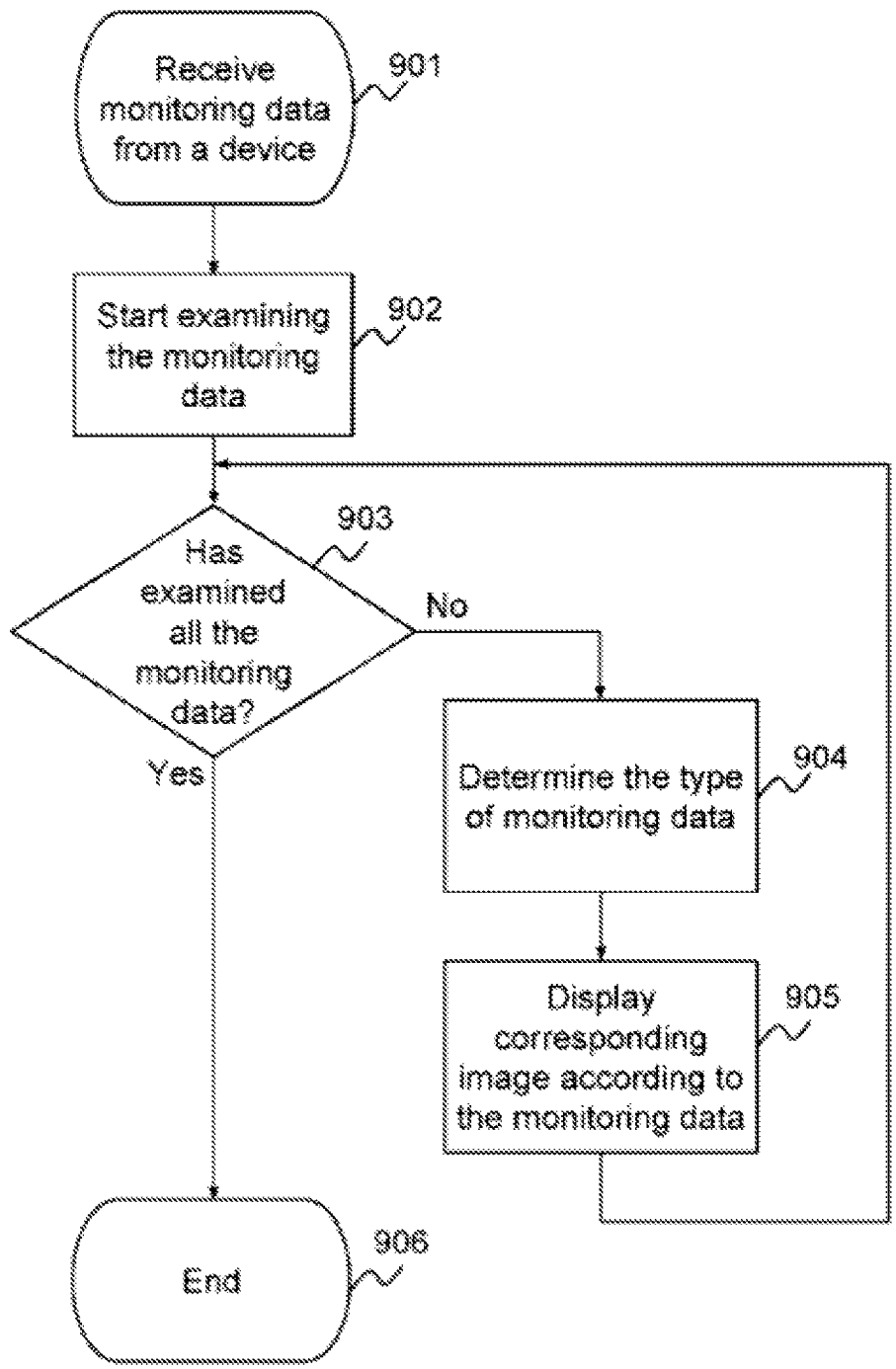
[Fig. 9]

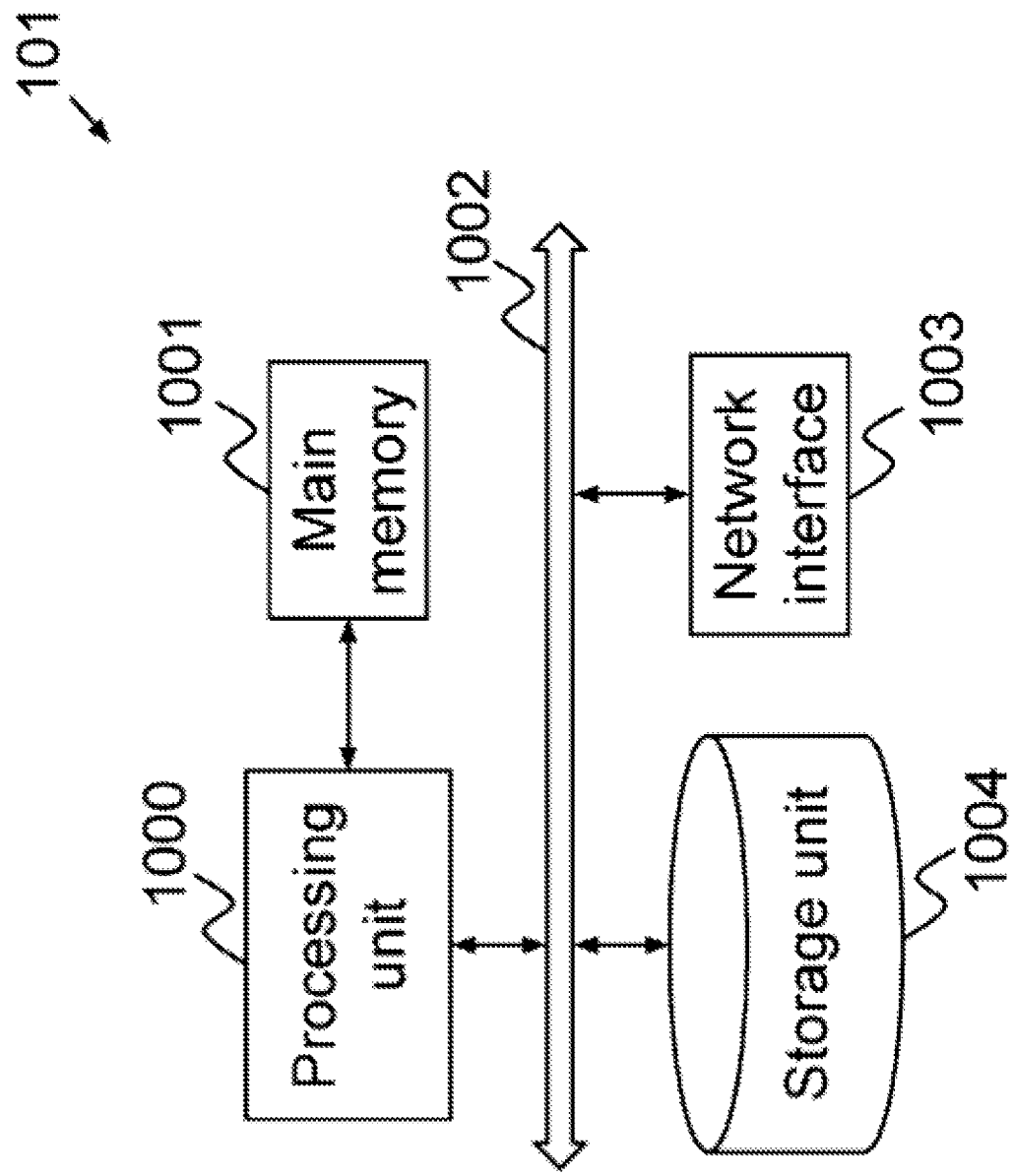
[Fig. 10]

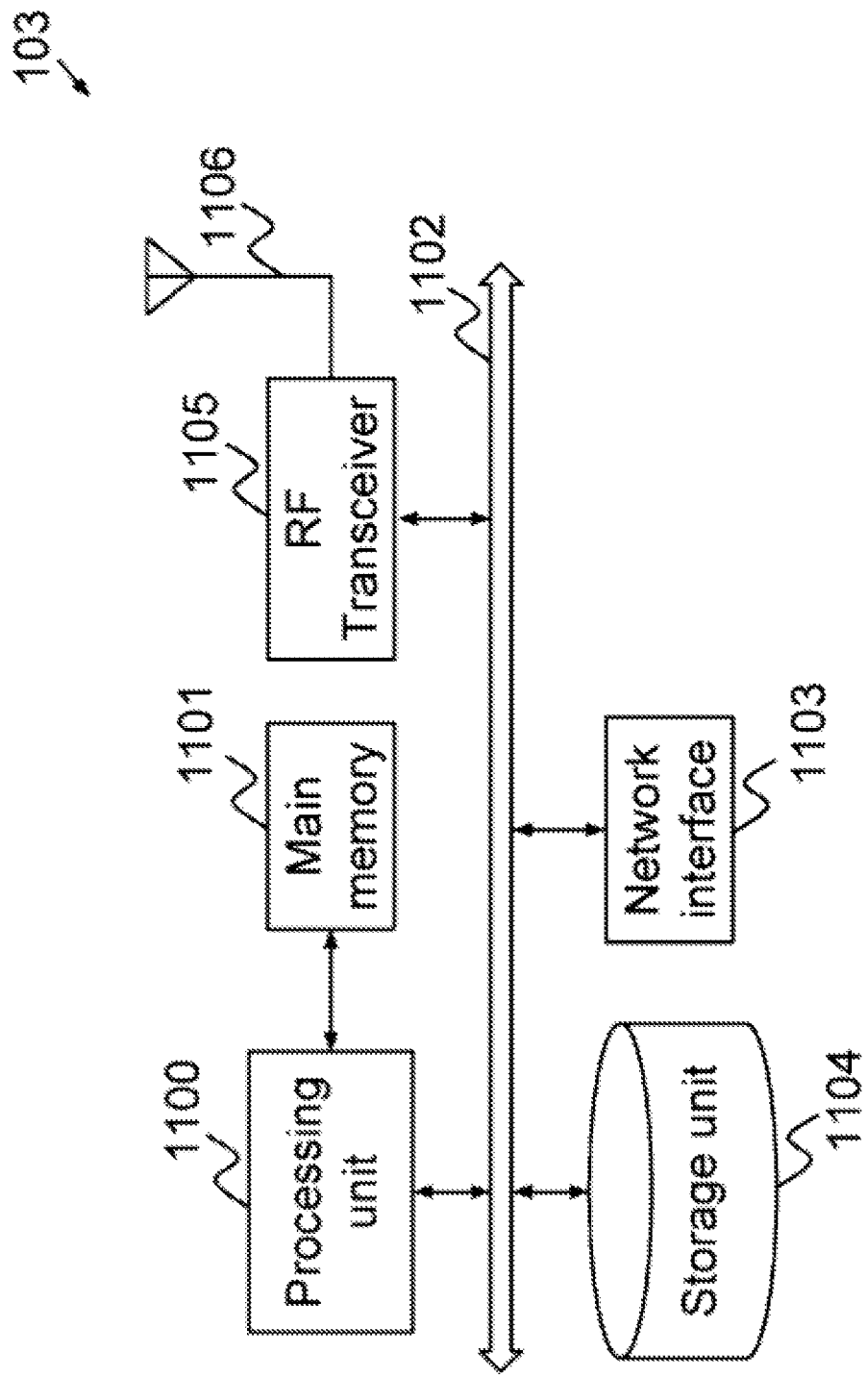

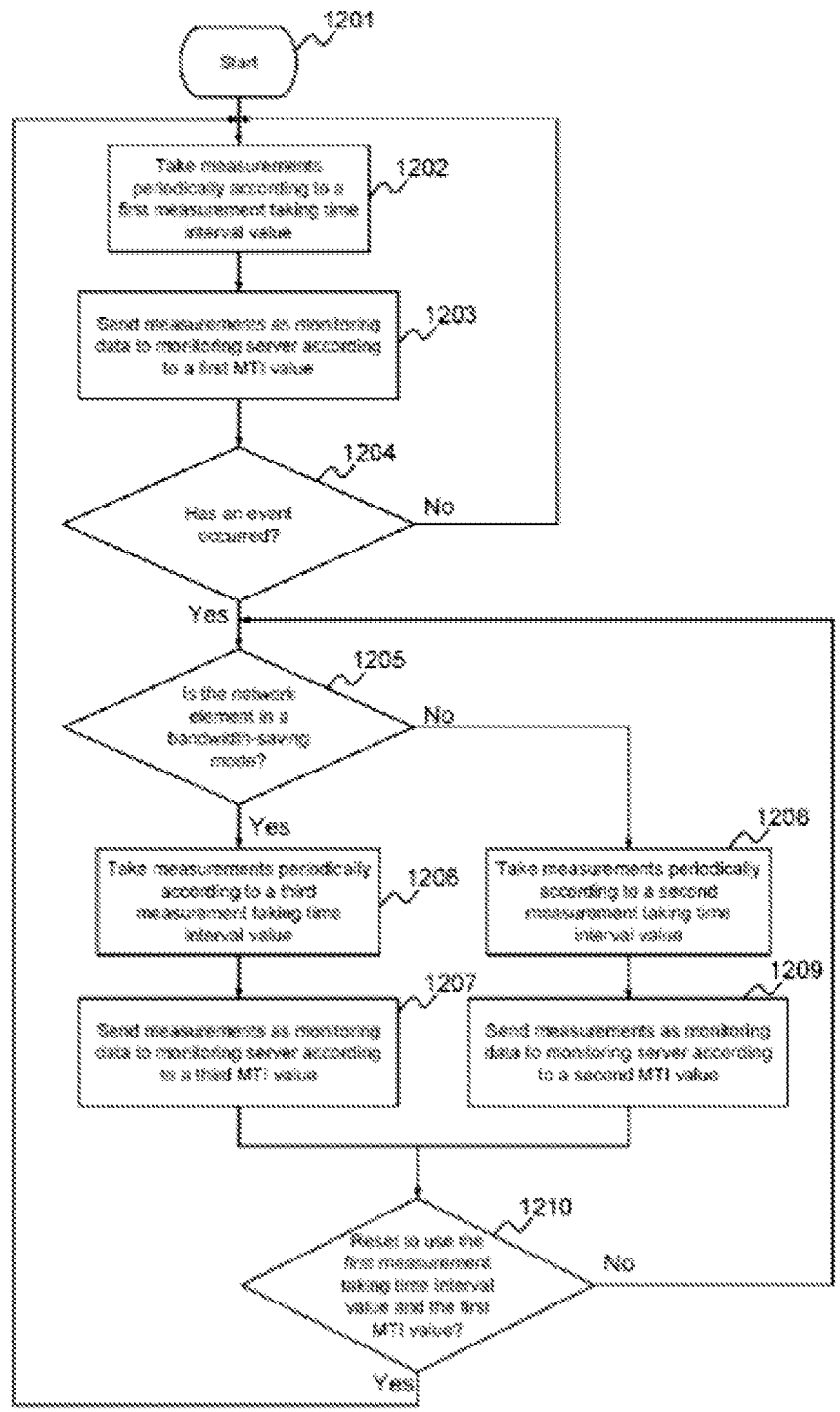
[Fig. 12]

SYSTEMS AND METHODS FOR CHANGING THE FREQUENCY OF RETRIEVING MONITORING DATA

TECHNICAL FIELD

The present invention relates in general to the field of collecting monitoring data. More particularly, the present invention relates to allowing frequency to be changed for retrieving monitoring data from a network connected device by a monitoring server or sending monitoring data by a network connected device by a monitoring server.

BACKGROUND ART

It is common to retrieve information from an electronic device for monitoring the environment of the electronic device. For example, a server may periodically retrieve temperature information as monitoring data from the electronic device. The transmission of monitoring data consumes network resources, even though the more frequent collection of monitoring data may allow collection of higher amount of monitoring data and results in more accurate, more precise and/or more updated analysis of the monitoring data. As network resources for wireless communications are usually more limited than for wired communications, the frequency of retrieving monitoring data from a mobile device may need to be adjusted according to different situations.

Further, when a user is actively viewing monitoring data, for example, through a terminal, there may be a need to retrieve monitoring data more frequently as the user may be interested in the most recent monitoring data. The images shown on the terminal may also need to be updated more frequently and to display different types of monitoring data. On the other hand, the user may not want the monitoring data to consume valuable bandwidth and may select to lower the frequency of retrieving monitoring data.

Therefore, there is currently no solution to allow flexible retrieval of monitoring data from a mobile device.

DISCLOSURE OF INVENTION

Summary

The present invention discloses methods and systems for receiving monitoring data from a network connected device by a monitoring server. The monitoring server sends notifications to the network connected device periodically according to a time interval. The notifications include a request for the monitoring data and the time interval is set to a first value. Then the monitoring server receives monitoring data from the network connected device and stores the monitoring data. When one condition is satisfied, the time interval is changed to a second value. When the time interval is changed to a second value, the frequency of sending notifications to the network connected device from monitoring server is changed.

According to one of the embodiments of the present invention, the second value is lower than the first value when an authorized user is logged in.

According to one of the embodiments of the present invention, the one condition is satisfied when an authorized user has chosen to change the first value.

According to one of the embodiments of the present invention, the monitoring data is chosen from a group consisting of Global Positioning System (GPS) location data, time stamp, data received from general purpose input/output (GPIO) pins of the network connected device, video data, audio data, and image data.

According to one of the embodiments of the present invention, the notifications comprise authentication information.

According to one of the embodiments of the present invention, the notifications and monitoring data are sent through an aggregated connection between the network connected device and the monitoring server.

According to one of the embodiments of the present invention, the monitoring server sends a notification to the network connected device. The notification includes a request for the monitoring data and a monitoring time interval. Monitoring server receives and stores monitoring data from network connected device. When one condition is satisfied, the time interval is changed to a second value. When the monitoring time interval is changed, monitoring server sends a new notification to the network connected device.

According to one of the embodiments of the present invention, monitoring server sends information corresponding to the monitoring data to a terminal for displaying.

According to one of the embodiments of the present invention, the new notification includes an instruction. The instruction is for instructing the network connected device to cease to send monitoring data to the monitoring server.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

FIG. 1 illustrates a network environment according to various embodiments of the present invention. Monitoring server 101 is connected to interconnected networks 108 such as the Internet. Monitoring server 101 may perform a monitoring process through interconnected networks 108. Mobile device 103 is installed in vehicle 102. A block diagram of monitoring server 101 is illustrated in FIG. 10. Mobile device 103 is wirelessly connected to interconnected networks 108. A block diagram of mobile device 103 is further illustrated in FIG. 11.

Router 104 may have multiple Local Area Network (LAN) interfaces and multiple Wide Area Network (WAN) interfaces. Router 104 is connected to interconnected networks 108 through its WAN interfaces.

Network node 105 is connected to interconnected networks 108. Network node 105 may be a personal computer, a server, a router, a network PC, etc.

Server 106 is connected to interconnected networks 108. Server 106 may comprise a processing unit, a system memory, storage units, user input interfaces, network interfaces, output peripheral interfaces, etc. Server 106 may have various functions. For example server 106 may be a web server. A user may access a web page hosted by server 106 through router 104 and interconnected networks 108.

Terminal 107 is connected to interconnected networks 108. A user may user terminal 107 to access monitoring server 101 directly through interconnected networks 108. Terminal 107 comprises a display, such as a cathode ray tube (CRT), plasma display, or a liquid crystal display (LCD), for displaying information to an administrator or user of the terminal. Terminal 107 also comprises an input device to allow the administrator or user of the terminal to communicate information and commands to a processing unit.

Those skilled in the art would understand that any number of nodes, devices, links, etc may be used in interconnected networks 108, and that the view shown herein is for simplicity.

FIG. 2 is a flowchart illustrating a process according to one of the embodiments of the present invention. In step 201, the monitoring process starts at monitoring server 101. For illustration purpose only, network node 105 is monitored by monitoring server 101. Monitoring server 101 retrieves data from network node 105 in step 203 after waiting for a time period in step 202. The time period is defined by a monitoring time interval (MTI). The data may be any information that can be retrieved from network node 105 including time stamp, GPIO pins readings, network performance data, CPU loading, storage usage, location information, temperature sensed, video recorded, audio recorded, images captured, chemicals sensed, etc. Those who are skilled in the art would appreciate that there are myriad types of data that can be retrieved from an electronic device such as network node 105.

The value of MTI may be in the range from one second to a few hours. The smaller the value of the MTI is, the more frequently monitoring server 101 will retrieve data from network node 105. On the other hand, the bigger of the value the MTI is, the less frequently monitoring server 101 will retrieve data from network node 105. As frequent collection of data may generate heavy network traffic loads, the delay caused by MTI may be used to reduce such network traffic loads. The MTI may be a predefined value or may be adjustable by monitoring server 101.

The value of MTI may be retrieved from a storage medium of monitoring server 101 or may be retrieved from a remote server/database that is accessible by monitoring server 101. The value of MTI may also be determined based on a set of criteria. For example, when a user is logged into monitoring server 101 for monitoring network node 105, the value of MTI may change. In another example, depending on resources available for network node 105, the value of MTI may change in order to allow more frequent or less frequent transmission of monitoring data. There is no limitation of where the value of MTI is stored or how MTI is determined.

Upon an instruction from a user, a signal from a predefined timer, a predefined number of collections performed or other inputs/instructions, monitoring server 101 decides whether the monitoring process should be stopped in step 204. If monitoring server 101 decides to continue the monitoring, step 202 will be performed again. Otherwise, the monitoring process is ended in step 205.

In one variant, in step 203, monitoring server 101 may need to send a notification to network node 105 for retrieving data. When network node 105 receives the notification, it will send the data to monitoring server 101 according to the notification.

In one variant, monitoring server 101 may send a notification to an electronic device for retrieving data in step 203 after monitoring server 101 decides to continue the monitoring process in step 204. For example, network node 105 is monitored by monitoring server 101 in step 201. Monitoring server 101 sends a notification to network node 105 for retrieving data in step 203 before deciding whether to stop the monitoring process in step 204. Alternatively, monitoring server 101 may send the notification to network node 105 in step 203 after performing step 204 and deciding to continue the monitoring process. Therefore, monitoring server 101 may perform step 203 after performing step 204.

Using network performance data as an example of data that can be retrieved to monitoring server 101, monitoring server 101 may retrieve the network performance data directly from router 104 through interconnected networks 108. The network performance data retrieved may include bandwidth, latency, packet drops, CPU usage of router 104. Monitoring server 101 may retrieve data from router 104 after providing router authentication information. In one variant, router 104 may provide network performance data to monitoring server without the need of authentication information. In one variant, monitoring server 101 retrieve data using Simple Network Management Protocol (SNMP). However, there is no limitation of protocols. For example, monitoring server 101 may retrieve network performance data from network node using Hypertext Transfer Protocol (HTTP) or Secure File Transfer Protocol (SFTP). Monitoring server 101 may report the network performance data retrieved to a user or use the network performance data to determine the status of router 104 on a regular basis and take actions if needed. For example, monitoring server 101 may send out an alert message to a administrator of router 104 if the CPU usage of router 104 exceeds a threshold for fifteen minutes.

FIG. 6A illustrates the content of a notification according to one of the embodiments of the present invention. The notification may be sent to an electronic device for retrieving data. For illustration purpose only, the electronic device is mobile device 103. When monitoring server 101 tries to retrieve data from mobile device 103, monitoring server 101 sends notification 601 to mobile device 103. In one example notification 601 is sent as an Internet Protocol (IP) packet. Notification 601 may comprise IP header 611, request for data field 612, and authentication information field 613. Request for data field 612 and authentication information field 613 are contained in the payload of the IP packet.

Those who are skilled in the art would appreciate that IP header 611 may comprise the IP address of monitoring server 101 as the source address and the IP address of an electronic device, for example, mobile device 103 as the destination address. Request for data field 612 may include a request for identity, type and/or nature of data to be retrieved from mobile device 103. Mobile device 103 may reply to the notification by providing monitoring data corresponding to the request. There is no limit on the request for identity, type and/or nature of data in request for data field 612. For example, request for data field 612 may include a request for GPS location of mobile device 103. Then mobile device 103 sends its GPS location as monitoring data to monitoring server 101. In another example, request for data field 612 may include requests for GPS location, nearby WiFi Service set identification (SSID) and client list of mobile device 103. Then mobile device 103 sends its GPS location, identified WiFi SSID and client list to monitoring server 101 as the monitoring data. Request for data field 612 may be in the form of, but not limited to, string, binary data, Extensible Markup Language (XML) or numerical data.

In one embodiment, request for data field 612 comprises a request for information provided by a sensor of an electronic device. There is no limitation to the information that can be provided by a sensor. There is also no limitation to the type of the sensor. For example, mobile device 103 may provide temperature sensed by a temperature sensor connected to mobile device 103 as monitoring data to monitoring server 101 after receiving a notification from monitoring server 101. The temperature sensor may be integrated with mobile device 103. However, there is no limitation to where and how a sensor is connected to mobile device 103. For example, the temperature sensor may be connected to mobile device 103 through general-purpose input/output (GPIO) pins of mobile device 103. In another example, the temperature sensor may be connected to mobile device 103 through a LAN.

Therefore, when monitoring server 101 receives monitoring data from mobile device 103, the monitoring data may include GPS location and temperature sensed. Monitoring server 101 may store the monitoring data at its local storage medium or a remote storage medium accessible through a network. Monitoring server 101 may also display temperature sensed along with GPS location of the mobile device 103 on the same webpage being displayed at a terminal.

Authentication information field 613 contains information to confirm the authenticity of a receiver of data. For example, monitoring server 101 may be the sender of notification 601 and the receiver of data sent by mobile device 103. In one example, authentication information field 613 may include login information of a person who is authorized to access router 104. In one example, authentication information field 613 is encrypted. In one variant, there is no need to have authentication information 613 in notification 601 if mobile device 103 does not need to verify the authenticity of notification 601 or the authenticity of notification can be confirmed through IP header 611. In one variant, mobile device 103 is configured to send data to a predefined IP address. Therefore, only a server at the predefined IP address may be able to receive the data. For example, mobile device 103 is configured to send data to monitoring server 101 upon receiving notification 601. Therefore, notification 601 is only used by mobile device 103 as a trigger to determine when to send data but not where to send data.

FIG. 7A is a flowchart illustrating a process according to one of the embodiments of the present invention. In step 701, the monitoring process starts at monitoring server 101. For illustration purpose only, network node 105 is monitored by monitoring server 101. In step 702, monitoring server 101 determines the value of MTI. The value of MTI may be retrieved from a storage medium of monitoring server 101, may be retrieved from a remote server/database that is accessible by monitoring server 101 or determined by monitoring server 101 according to a set of criteria. The criteria may be a time when the monitoring process is started, the size of monitoring data, etc. Then in step 703, monitoring server 101 sends a notification 621 to network node 105 for retrieving data. FIG. 6B is an illustration of the format of the notification.

When network node 105 receives notification 621, network node 105 may start sending data to monitoring server 101 based on the types or nature of data specified in request for data field 612 periodically. The time between each data sent is based on the value defined in MTI field 614. For example, if MTI field 614 is set to ten, network node 105 sends the data to monitoring server 101 every ten seconds. In another example, if MTI field 614 is set to five, network node 105 sends the data to monitoring server 101 every five milliseconds. The unit of MTI may be preconfigured or stated in request for data field 612 or MTI field 614.

In step 704, monitoring server 704 determines whether to continue monitoring network node 105. When it is determined that the monitoring process should be stopped, monitoring server 101 sends a new notification to network node 105 to stop network node 105 from sending data to monitoring server 101 in step 705. The process then stops at 706. On the other hand, if the monitoring continues, monitoring server 101 should continue receiving data from network node 105 based on the time period set by the value of MTI.

In one variant, monitoring server 101 may send a new notification to network node 105 if the value of MTI has been changed. For illustration purpose only, network node 105 is monitored by monitoring server 101 and MTI is set to ten seconds originally. Then network node 105 may start sending data to monitoring server 101 every ten seconds after monitoring server 101 performs step 703. However, monitoring server 101 may determine to decrease the value of MTI from ten seconds to five seconds before step 704. Therefore, monitoring server 101 may send a new notification 621 to network node 105. MTI field 614 of the new notification 621 is set to five seconds.

FIG. 7B is a flowchart illustrating a process according to one of the embodiments of the present invention. A monitoring process is started by monitoring server 101 in step 711. For illustration purpose only, network node 105 is monitored by monitoring server 101. Monitoring server 101 sends notification 621 to network node 105 in step 703 and notification 621 is received by network node 105 in step 712. Notification 621 may include IP header 611, request for data field 612, authentication information field 613, MTI field 614, etc. For example, request for data field 612 may include requests for CPU loading data and storage usage data if network node 105 is a server. For illustration purpose, MTI field 614 is set to ten seconds as defined by monitoring server 101. In step 713, network node 105 retrieves request for data from notification 621. In step 714, network node 105 verifies the authentication based on the authentication information from authentication information field 613. The process is ended in step 718 if the authentication is not successful. If the authentication is successful, network node 105 waits for ten seconds as defined in MTI in step 715. Then network node 105 sends monitoring data to monitoring server 101 in step 716. In step 717, network node 105 decides whether to stop sending data to monitoring server 101. For example, monitoring server 101 may send a new notification to network node 105 in step 705. The new notification may include an instruction to stop network node 105 from sending further monitoring data to monitoring server 101. This allows network node not to consume network resource any more. If the new notification is received by network node 105 before step 717, then network node 105 stops sending data to monitoring server 101 and the process is ended in step 718. If the new notification is not received, network node 105 continues to send monitoring data to monitoring server 101 every ten seconds until the new notification is received.

Authentication information may be included in authentication information field 613. In one variant, authentication information may be a variable information depending on the method used in authentication process in step 714. For example, network node 105 is monitored by monitoring server 101. Monitoring server 101 is given a password for logging into network node 105. The password then is encrypted as authentication information and is included in authentication information field 613. Those who are skilled in the art would appreciate that there are myriad encryption methods. The authentication information can be a combination of characters and digits. Also, the length of authentication information may be variable and may be limited by the size of authentication information field 613.

In one variant, there is no need to have authentication information in authentication information field 613. For example, network node 105 is monitored by monitoring server 101. Network node 105 receives a notification in step 712 and retrieves IP address of monitoring server 101 from IP header 611. As monitoring server 101 is authorized to access network node 105, IP address of monitoring server 101 is recognized by network node 105. Then network node 105 sends monitoring data to monitoring server 101. Instead of authentication information, network node 105 uses IP address of monitoring server 101 to confirm authenticity of monitoring server 101 as a receiver of monitoring data.

In one variant, network node 105 may perform an authentication by various methods in step 714. For example, verification of authentication may rely on login credential if authentication information field 613 includes login information of a person who is authorized to access network node 105. On the other hand, authentication can be a policy check. Network node 105 may not send monitoring data to monitoring server 101 if there is no policy matching on authentication information. The policy can be predefined in network node 105 or configurable by an administrator of network node 105.

There is one major difference between the embodiments illustrated in FIG. 2 and FIG. 7A. For the embodiment illustrated in FIG. 2, monitoring server 101 needs to continue to send notification to an electronic device in order to retrieve data from the electronic device. The frequency of sending notification is determined by MTI. Comparatively, for the embodiment illustrated in FIG. 7A, monitoring server 101 only needs to send the notification once, then the electronic device is able to send the data to monitoring server 101 periodically. The frequency of the data being sent by the electronic device is determined by the value of MTI set in MTI field 614. It may also be noted that the process illustrated in FIG. 2 is a pull method for retrieving monitoring data by sending notifications periodically while the process illustrated in FIG. 7A is a push method for retrieving monitoring data by instructing an electronic device to send monitoring data periodically to monitoring server 101.

One of the benefits of the embodiment illustrated in FIG. 7A is that fewer number of notifications is sent by monitoring server 101. Fewer number of notifications may reduce network traffic loads. As notification 601 may include authentication information 613, fewer notifications may also reduce the chance of leakage of authentication information 613.

One of the benefits of the embodiment illustrated in FIG. 2 is that the electronic device being monitored does not need to process the notification illustrated in FIG. 6B. For example, if mobile device 103 is not manufactured by the same vendor of monitoring server 101, mobile device 103 may not be compatible to process MTI field 614 and may not be able to send data periodically to monitoring server 101 based on MTI field 614. Therefore, monitoring server 101 needs to proactively poll mobile device 103 for retrieving data from mobile device 103.

FIG. 3A is a flowchart illustrating a process according to one of the embodiments of the present invention. Monitoring server 101 may perform a monitoring process periodically at a normal MTI in step 301. For example, a user may monitor GPS location of mobile device 103 through monitoring server 101. For illustration purpose, the user is authorized to access monitoring server 101. In step 302, the user logs on to monitoring server 101. Then monitoring server 101 may decrease MTI from the normal value to a lower value in step 303. For illustration purpose only, if the normal MTI is set to five minutes, the new MTI may be set to two minutes after the user is logged on. The decrease of MTI allows monitoring server 101 to retrieve GPS location data of mobile device 103 in a more frequent manner after the user is logged on. In step 304, monitoring server 101 verifies whether the user has logged off. If the user has logged off, the monitoring server 101 may increase the MTI back to five minutes, the normal MTI, in step 305. If the user is still logged on, monitoring server 101 continues to perform step 304. Therefore, as long as the user is logged on, monitoring server 101 may maintain the MTI at two minutes. In step 306, monitoring server 101 continues to perform the monitoring process at the normal MTI after the user has logged off from monitoring server 101.

In another example, monitoring server 101 retrieves monitoring data from a plurality of network elements, for example, a plurality of home use air-quality sensors (AQSs) distributed in a residential building. The default value for monitoring server 101 to retrieve measurements from the AQSs is every 12 hours at step 301 when the user is not logged on. When the user is logged on at step 302, the default value of the value of MTI for monitoring server 101 to retrieve measurements from the AQSs is decreased to five seconds at step 303. However for a group of AQSs, due to limited networking resources, the value of MTI is decreased to two minutes at step 303. This group of AQSs may be considered as being put into bandwidth-saving mode. Monitoring server 101 may store the default values and the value of MTI of the group at a storage medium. The default values and the value of MTI of the group may be configured by a user or an administrator of monitoring server 101 and/or AQSs for flexibility. Therefore, monitoring server 101 is able to determine the corresponding value of MTI for each AQS. Particularly, the AQSs take measurements of the air quality, for illustration purpose, every ten seconds. The measurements may be stored or cached at the AQSs. When a AQS is ready to transmit the measurements as monitoring data to monitoring server 101, AQS compresses the measurements first in order to save networking resources. When monitoring server 101 sends a notification to the AQSs at step 203, the AQSs may also take more frequent measurements, such as one measurement for every two seconds. Therefore, when the user is logged on, AQSs may collect more frequent measurements and sends the measurements as monitoring data more frequent to monitoring server 101, comparing to when the user is not logged on. However the measurements are transmitted to monitoring server 101 in a less frequent manner comparing to those AQSs that are not in bandwidth saving mode.

One of the benefits of the embodiment illustrated in FIG. 7A is that fewer number of notifications is sent by monitoring server 101. Fewer number of notifications may reduce network traffic loads. As notification 601 may include authentication information 613, fewer notifications may also reduce the chance of leakage of authentication information 613.

FIG. 3B is a flowchart illustrating a process according to one of the embodiments of the present invention. FIG. 3B is similar to FIG. 3A but step 304 is replaced by step 304*b*. In one variant, the value of MTI is changed back to a normal value after a time limit has been reached. The time limit can be a predefined value or adjustable by monitoring server 101. The value of the time limit may be stored in a storage medium or retrieved over an interconnected network. For example, monitoring server 101 may decrease MTI to a lower value after a user has logged on at step 303. In step 304*b*, monitoring server 101 decides whether a time limit has been reached. When the time limit has been reached, the value of MTI is changed back to a normal value in step 305. Otherwise, the value of MTI remains unchanged and monitoring server 101 may continue to perform step 304*b*. Therefore, the value of MTI may be changed further after MTI has already been changed.

FIG. 3C is a flowchart illustrating a process according to one of the embodiments of the present invention. FIG. 3C is similar to FIG. 3B but step 305 is replaced by steps 311, 312 and 305*a*. In one variant, monitoring server 101 may stop retrieving monitoring data if a user decides to stop a monitoring process after a time period has expired. For example, a user may monitor mobile device 103 through monitoring server 101. The user is logged into monitoring server 101 in step 302 and the value of MTI is decreased in step 303. In step 304*b*, monitoring server 101 decides whether a time limit has been reached. When the time limit has been reached, monitoring server 101 prompts the user asking for continuation of the monitoring process in step 311. If the user decides to stop the monitoring process in step 312, monitoring server 101 may stop retrieving monitoring data from mobile device 103 in step 305*a*. Otherwise, monitoring server 101 may continue to perform step 304*b*.

The embodiments illustrated in FIG. 3B and FIG. 3C may have several benefits. For illustration purpose, referring to FIG. 3B, a user is logged into monitoring server 101 and MTI is decreased from a normal value to a lower value in step 303. Monitoring server 101 retrieves the monitoring data in a more frequent manner. However, the user may not be interested in the monitoring data and the user is idle for fifteen minutes. If the time limit of step 304*b* is set to ten minutes, for illustration purpose, MTI is increased back to a normal value after ten minutes in step 304*b*. So it may save bandwidth and resources allocated to mobile device 103 five minutes earlier.

Furthermore, referring to FIG. 3C, the user is prompted to stop the monitoring process in step 311. If the user has chosen to stop the monitoring process in step 312, monitoring server 101 may stop retrieving monitoring data from mobile device 103 in step 305*a*. As shown in FIG. 3C, step 311 may provide an option for the user to stop the monitoring process if the user is not interested in the monitoring data. Similarly, step 311 may provide an option for the user to start the monitoring process again even though a time period has expired in step 304*b*.

A user may be authorized to access monitoring server 101 and is capable of connecting to monitoring server 101 through a terminal such as terminal 107. The user may be required to perform an authentication process in order to access monitoring server 101. The user may log on to monitoring server 101 through a user interface, namely monitoring server user interface (MSUI) shown on terminal 107. A login web page is displayed on a web browser at terminal 107. The user may then enter the username and password on the login web page. The user is then able to access monitoring server 101 after monitoring server 101 confirms the user's identity. The MSUI may be a web page, a LCD display, an audio user interface, a video user interface, etc.

FIG. 8A illustrates one of the embodiments according to the present invention. A street map 801*a* of Palo Alto is shown in FIG. 8A. A user is not logged into monitoring server 101 yet before step 302. Mobile device 103 is monitored by monitoring server 101. For illustration purpose, MTI is set to ten seconds, a normal value. Mobile device 103 is installed in a vehicle, and the vehicle is moving along Embaradero road from Cowper street towards Walter Hays Elementary School. Points 802*a-f* represent GPS location data of mobile device 103 retrieved by monitoring server 101 within one minute.

In one variant, monitoring server 101 may retrieve GPS location data from mobile device 103 using the embodiment illustrated in FIG. 2. For illustration purpose, monitoring server 101 starts monitoring mobile device 103 in step 201. In step 202, monitoring server 101 waits for ten seconds as defined in MTI. In step 203, monitoring server 101 sends notification 601 to mobile device 103 every ten seconds. Mobile device 103 then sends GPS location data to monitoring server 101 upon receiving notification 601. In step 204, monitoring server 101 decides whether the monitoring process should be stopped. If there is no other inputs/instructions, monitoring server 101 may perform step 202 again in order to continue monitoring mobile device 103. Otherwise, the monitoring process is ended in step 205. In this case, monitoring server 101 polls mobile device 103 periodically for retrieving monitoring data from mobile device 103.

Alternatively, monitoring server 101 may retrieving GPS location data from mobile device 103 using the embodiment illustrated in FIG. 7A. For illustration purpose, monitoring server starts to monitor mobile device 103 in step 701. MTI is set to ten seconds and the value of MTI is determined by monitoring server 101 in step 702. Then in step 703, monitoring server 101 sends notification 611 to mobile device 103. MTI field 614 is set to ten seconds in notification 611. When mobile device 103 receives notification 611, mobile device may start sending data to monitoring server every ten seconds as defined in MTI. In step 704, monitoring server 101 decides whether the monitoring process should be stopped. If monitoring server 101 decides to stop the monitoring process, monitoring server 101 may send a new notification to mobile device 103 in step 705 so that mobile device 103 stops sending data to monitoring server 101. The monitoring process then stops in step 706. Otherwise, monitoring server 101 may continue retrieving GPS location data from mobile device 103 in step 704. In this case, mobile device 103 continues to push its GPS location data to monitoring server 101 periodically until further notification is received from monitoring server 101 in step 705.

In one variant, FIG. 8A may be shown on a web page, namely, location page at terminal 107. Monitoring server 101 may send information such as the content of the location page to terminal 107 for displaying.

FIG. 8A may be a diagram displayed on the location page when a user is not logged into monitoring server 101. For illustration purpose, MTI may be determined by monitoring server 101 in step 301. MTI is set to ten seconds, a normal value. As long as the user is not logged into monitoring server 101 in step 302, MTI may remain unchanged.

For the present invention, GPS location data is not the only type of monitoring data that can be sent by or retrieved from mobile device 103. There may be different types of monitoring data. For example, the monitoring data may include temperature sensed at mobile device 103 and video captured at a camera connected to mobile device 103.

In one example, server 106 is being monitored by monitoring server 101.

The monitoring data may include CPU usage, memory usage, storage usage and the number of processes. For illustration purpose, MTI is set to ten seconds. Monitoring server 101 may send notifications to server 106 for retrieving the monitoring data every ten seconds as defined in MTI. Alternatively, monitoring server 101 may send a notification 611 to server 106. Server 106 may then send the monitoring data to monitoring server 101 every ten seconds as defined in MTI field 614. For illustration purpose, the location of server 106 is fixed. So, unlike mobile device 103, a user may not be interested in the location of server 106. Therefore, GPS location data of server 106 may not included in the monitoring data.

On the other hand, monitoring data including CPU usage, memory usage, storage usage and the number of processes may be retrieved from server 106.

FIG. 8B illustrates one of the embodiments according to the present invention. A street map 801b of Palo Alto is shown in FIG. 8B. FIG. 8B is similar to FIG. 8A but additional points 803a-d are displayed on FIG. 8B. Mobile device 103 is monitored by monitoring server 101. For illustration purpose, a user has logged into monitoring server 101 and is accessing the location page. Then MTI is decreased from a normal value to a lower value. For example, MTI is decreased from ten seconds to six seconds. As more updated GPS location data is retrieved from mobile device 103, the user may monitor mobile device 103 more accurately and frequently.

In one variant, monitoring server 101 may retrieve GPS location data from mobile device 103 using the embodiment illustrated in FIG. 2. As MTI is decreased, monitoring server 101 may send notifications in a more frequent manner in step 203, such that more data are retrieved from mobile device 103.

Alternatively, monitoring server 101 may retrieve GPS location data from mobile device 103 using the embodiment illustrated in FIG. 7A. As MTI is decreased, monitoring server 101 sends one notification to mobile device 103 on the reduction of MTI. Mobile device 103 then continues to send GPS location data to monitoring server 101 in a more frequent manner.

The flowchart illustrated in FIG. 3A can be viewed in conjunction with FIG. 8B. In one example, MTI is decrease if a user is at the location page. For example, a user has logged into monitoring server 101 in step 302 and is accessing the location page. When the user is at the location page, MTI is decreased from ten seconds to six seconds in step 303. As MTI is decreased, monitoring server 101 may retrieve GPS location data at a higher frequency. As illustrated in FIG. 8B, points 803a-b are the additional GPS location data retrieved by monitoring server 101 after MTI is decreased.

In one variant, the embodiment illustrated in FIG. 2 and the embodiment illustrated in FIG. 7 may have different impacts on the change of MTI. For the embodiment illustrated in FIG. 2, the frequency of sending notification is determined by MTI. If MTI is decreased to a lower value, more numbers of notifications may be sent by monitoring server 101 in step 203. It may generate more network traffic loads. Comparatively, for the embodiment illustrated in FIG. 7, monitoring server 101 only needs to send another notification for the change of MTI. The new MTI is included in the notification. Then the electronic device is able to send the data to monitoring server 101 periodically according to the new MTI.

A user may choose to log off from monitoring server 101. For example, there may be a button displayed on the MSUI. Monitoring server 101 may consider a user is logged off if the user is accessing the button on the MSUI. Alternatively, a user is logged off if the user is idle for a period of time. For example, a user is logged on to monitoring server 101 but has no activity for fifteen minutes. Monitoring server 101 may consider the user has logged off.

FIG. 4 is a flowchart illustrating a process according to one of the embodiments of the present invention. FIG. 4 is similar to FIG. 3A but steps 401 and 402 are performed between steps 303 and 304. In one variant, a user may choose to increase MTI after the user is logged on. For example, monitoring server 101 may decrease MTI to a lower value after a user is logged on in step 303. However, if the user has chosen to increase the value of MTI into a higher value in step 401 in order to save bandwidth and resources, monitoring server 101 may increase MTI into the new value in step 402. The value may be decided by the user. Alternatively, when the user chooses not to increase MTI in step 401, monitoring server 101 may continue to retrieve GPS location data from mobile device 103 in a lower value of MTI.

FIG. 8C illustrates one of the embodiments according to the present invention. A street map 801c of Palo Alto is shown in FIG. 8C. In one variant, MTI is increased if a user has chosen to increase MTI. For example, a user may monitor GPS location of mobile device 103 through monitoring server 101. The user is accessing the location page after logging into monitoring server 101. The location page may contain a button for increasing MTI. When the user is at the location page, MTI is decreased from ten seconds to six seconds in step 303. However, the user may then increase MTI in step 401 in order to reduce network traffic loads. In step 402 MTI is increased from six seconds to fifteen seconds. Then monitoring server 101 may send notifications to mobile device 103 for retrieving GPS location data in a less frequent manner. Alternatively, mobile device 103 may send its GPS location data to monitoring server 101 in a less frequent manner. Points 802a,c,d,e may represent GPS location data retrieved by monitoring server 101 after MTI is increased. Comparing FIG. 8C with FIG. 8A, points 802b and 802f are removed from FIG. 8C. So FIG. 8C has fewer number of GPS location data retrieved by monitoring server 101.

One of the benefits of the embodiment illustrated in FIG. 8C is that fewer number of data retrieved may save bandwidth and resources allocated to mobile device 103.

FIG. 9 is a flowchart illustrating a process according to one of the embodiments of the present invention. For illustration purpose, mobile device 103 is monitored by monitoring server 101. A user has logged into monitoring server 101 and is accessing the location page. MTI is set to six seconds. Monitoring server 101 may send notifications to mobile device 103 for retrieving data every six seconds as defined in MTI. Alternatively, mobile device 103 may send its data to monitoring server 101 every six seconds. The monitoring process is started before step 901. In step 901, monitoring server 101 receives monitoring data from mobile device 103. The monitoring data may comprise various types of monitoring data such as location information, network performance data, etc. Then monitoring server 101 starts to examine the monitoring data in step 902. In step 903, monitoring server 101 determines whether all the monitoring data has been examined. In step 904, monitoring server 101 determines the type of monitoring data. Based on the type of monitoring data, monitoring server 101 displays the corresponding image in step 905. If all the monitoring data has been examined in step 903, the process is ended in step 906. Otherwise, monitoring server 101 may continue to perform steps 904 and 905 until all the monitoring data is examined.

FIG. 8D illustrates one of the embodiments according to the present invention. A street map 801*d* of Palo Alto is shown in FIG. 8D. For illustration purpose, mobile device 103 is installed in a taxi, and the taxi is moving along Embaradero road from Cowper street towards Walter Hays Elementary School. Points 805*a-f* represent GPS location data of the taxi carrying passengers. Similarly, points 806*a-d* represent GPS location data of the taxi but there is no passenger in the taxi. As shown in FIG. 8D, the passenger may get out of the taxi at point 806*a* near Tasso street. At points 806*a-d*, the taxi has no passenger. The taxi may then pick up another passenger again at point 805*d* near Byron street.

The flowchart illustrating in FIG. 9 can be viewed in conjunction with FIG. 8D. For illustration purpose, a user may monitor the status of the taxi through monitoring server 101. The status of the taxi may include GPS location and the number of passengers of the taxi. The user has logged into monitoring server 101 and is accessing the location page. Since the user is at the location page, MTI is decreased from a normal to a lower value. For example, MTI is set to six seconds in step 303. The monitoring process is started before step 901. Monitoring server 101 may send notifications to mobile device 103 for retrieving monitoring data every six seconds as defined in MTI in step 203. Alternatively, monitoring server 101 may send one notification 611 to mobile device 103 in step 703 to instruct mobile device 103 to send monitoring data back every six seconds. Mobile device 103 may then send the monitoring data to monitoring server 101 every six seconds as defined in MTI field 614. In step 901, monitoring server 101 receives the monitoring data from mobile device 103. Monitoring server 101 starts to examine the monitoring data in step 902. In step 904 and 905, monitoring server 101 determines the types of the monitoring data and display the corresponding image according to the monitoring data. For example, there may be two types of monitoring data such as GPS location data and information of whether the taxi is occupied by a passenger. GPS location data of the taxi can be represented by a circle. In one variant, if the taxi is occupied with a passenger, the monitoring data is represented by a filled circle in step 905. If the taxi is not occupied with a passenger, the monitoring data is represented by a non-filled circle in step 905. In step 903, monitoring server 101 determines whether all the monitoring data has been examined. If all the monitoring data is examined, the process is ended in step 906. Otherwise, monitoring server 101 may continue to perform steps 904 and 905 until all the monitoring data is examined.

FIG. 8E illustrates one of the embodiments according to the present invention. A street map 801*e* of Palo Alto is shown in FIG. 8E. For illustration purpose, a user may monitor the taxi through monitoring server 101. The monitoring data of the taxi may include GPS location data and whether the taxi is occupied with a passenger. The user has logged into the monitoring server 101 and is accessing the location page. However, the user may then choose to increase MTI in the location page in order to reduce traffic loads. For example, MTI is set to fifteen seconds in step 402. Then monitoring server 101 may send notifications to mobile device 103 for retrieving monitoring data every fifteen seconds as defined in MTI. Alternatively, monitoring server 101 may send one notification 611 to mobile device 103 in step 703. Mobile device 103 may then send the monitoring data to monitoring server 101 every fifteen seconds as defined in MTI field 614. Monitoring server 101 receives the monitoring data from mobile device 103 in step 901. In step 902, monitoring server 101 starts to examine the monitoring data. Monitoring server 101 examines the monitoring data in step 904. In one variant, a filled circle is displayed to illustrate the taxi is occupied with a passenger in step 905. Similarly, a non-filled circle is displayed to illustrate the taxi is not occupied with a passenger in step 905. In step 903, monitoring server 101 determines whether all the monitoring data has been examined. If all the monitoring data has been examined, the process is ended in step 906. Otherwise, monitoring server 101 may continue to perform steps 904 and 905 until all the monitoring data is examined.

Comparing FIG. 8E with FIG. 8D, points 805*b*, 805*c*, 806*b*, 806*d*, 805*d*, 805*e* are removed from FIG. 8E. As the user has chosen to increase MTI on the location page, the monitoring server 101 retrieves monitoring data in a less frequent manner. Therefore, FIG. 8E has fewer numbers of monitoring data retrieved by monitoring server 101.

FIG. 5 illustrates one of the embodiments according to the present invention. The monitoring process starts in step 500. In step 501, monitoring server 501 determines the value of MTI. In step 502, monitoring server 101 determines whether to perform the monitoring of an electronic device. For illustration purpose, the electronic device being monitored is mobile device 103. If no further monitoring process needs to be performed, the monitoring process ends in step 507. When the monitoring process should be continued, step 503 is performed to check if any condition is satisfied. The condition is used to determine whether the value of MTI should be changed to a new value or the value of MTI should be changed to a normal value. There is no limitation of the type a condition can be. There is also no limitation on the number of conditions.

For example, a condition may be based on the user identity that is logged into monitoring server 101. When a user has logged into monitoring server 101, monitoring server 101 may change the value of MTI to ten seconds from five seconds in step 504 as the identity of the user satisfies a condition. When the user has logged off, the value of MTI is changed back to ten seconds in step 505. When a different user has logged into monitoring server 101, the new value of MTI may not be ten seconds as the identity of the different user may not satisfy the same condition or may satisfy a different condition.

In another example, an ambulance is being monitored. When an ambulance has left its corresponding ambulance station, the monitoring process begins in step 500. The monitoring process stops in step 507 when it is determined that the ambulance is back to the ambulance station in step 502. A mobile device, for example, mobile device 103, is preconfigured with MTI value to be five seconds. Therefore, monitoring data is sent to monitoring server 101 every five seconds from mobile device 103. The monitoring data may include different types of monitoring data, including siren on/off status, siren loudness, GPS location data, video data captured inside the ambulance, audio data captured inside the ambulance and medical equipment data.

For illustration purpose, a first condition is satisfied when the siren is on and a second condition is satisfied when it is determined that traffic on the road is busy. Also, for illustration purpose, the siren is controlled by the driver of the ambulance and a emergency help control center determines whether traffic on the road is busy. The corresponding MTI values are three seconds and two seconds for the first condition and the second condition respectively.

Therefore, when the driver has turned on the siren, the MTI value is changed from five seconds to three seconds in step 504 as the first condition is satisfied in step 503. This allows more frequent monitoring data collection by monitoring server 101 for GPS location data, siren on/off status, siren loudness, GPS location data, video data captured inside the ambulance, audio data captured inside the ambulance and medical equipment data.

When the emergency help control center has determined that traffic on the road is busy, the second condition is also satisfied in step 503. A notification is sent to mobile device 103 from monitoring server 101. The notification may include a specific request for video capture from a camera mounted at the ambulance for road traffic video. The notification may also include a new MTI value of two seconds. Therefore, when mobile device 103 receives the notification, it will set its MTI to two seconds in step 505. Then mobile device 103 starts sending monitoring data, including video captured by the camera, back to monitoring server 101 every two seconds.

In one variant, when there are a plurality of conditions satisfied, there may be different MTI values. Monitoring server 101 may select the smallest MTI value as the new MTI value in order to have the most frequent collection of monitoring data. In another variant, monitoring server 101 may select the MTI value corresponding to the most recent satisfied condition.

FIG. 10 illustrates a block diagram of monitoring server 101 according to one of the embodiments of the present invention.

Monitoring server 101 comprises processing unit 1000, main memory 1001, system bus 1002, network interface 1003 and storage unit 1004. Processing unit 1000 and main memory 1001 are connected with each other directly. System bus 1002 connects processing unit 1000 directly with network interface 1003 and storage unit 1004. System bus 1002 can be any of several types of bus structures including a memory bus, a peripheral bus, and a local bus using any of a variety of bus architectures.

Processing unit 1000 executes program instructions or code segments for implementing embodiments of the present invention. A processing unit may be a microprocessor, a microcontroller, a digital signal processor (DSP), any combination of those devices, or any other circuitry configured to process information.

Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

Main memory 1001 and storage unit 1004 are storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The storage medium may include a number of software modules that may be implemented as software code to be executed by the processing unit 1000 using any suitable computer instruction type. The software code may be stored as a series of instructions or commands, or as a program in the storage medium.

Network interface 1003 can be an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

Network interface 1003 may be configured to transmit and/or receive data using a variety of different communication protocol.

Network interface 1003 may be implemented by an standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a Digital Subscriber Line (DSL) interface, a token ring interface, a serial bus interface, an universal serial bus (USB) interface, Firewire interface, Peripheral Component Interconnect (PCI) interface, etc.

FIG. 11 illustrates a block diagram of mobile device 103 according to one of the embodiments of the present invention.

Mobile device 103 comprises processing unit 1100, main memory 1101, system bus 1102, network interface 1103, storage unit 1104, RF transceiver 1105 and antenna 1106. Processing unit 1100 and main memory 1101 are connected with each other directly. System bus 1102 connects processing unit 1100 directly with network interface 1103, storage unit 1104 and RF transceiver 1105.

Processing unit 1100 executes program instructions or code segments for implementing embodiments of the communication apparatus of the present invention.

Memory 1101 and storage unit 1104 are storage medium. The storage medium may include a number of software modules that may be implemented as software code to be executed by processing unit 1100 using any suitable computer instruction type. The software code may be stored as a series of instructions or commands, or as a program in the storage medium.

Mobile device 103 can be a network connected device. Mobile device 103 may operate in a networked environment using logical connections to one or more network nodes, such as network node 105. The logical connections include a LAN and a WAN, but may also include other networks.

When used in LAN networking environment, mobile device 103 is connected a LAN through network interface 1103. When used in WAN networking environment, mobile device 103 may include a modem or other means for establishing communications over the WAN such as the Internet.

RF transceiver 1105 and antenna 1106 are connected with each other directly. RF transceiver is capable of transmitting and receiving data to and from a mobile network through antenna 1106.

According to one of the embodiments of the present invention, notifications and monitoring data is exchanged between a network connected device and monitoring server 101 through an aggregated connection. For example, notifications and monitoring data are exchanged between server 106 and monitoring server 101 through an aggregated VPN connection. The aggregated VPN connection may be formed by aggregating two different VPN tunnels. One of the two VPN tunnel may be established through a first network interface of server 106 and a first network interface of monitoring server 101. The other VPN tunnel may be established through a LTE modem coupled to server 106 and a second network interface of monitoring server 101. The benefits of have notifications and monitoring data being sent through an aggregated VPN connection include higher reliability and better security comparing to non-aggregated VPN connection.

For example, when the access network connecting to the first network interface of server 106 is congested or out-of-order, the notifications and monitoring data can then be sent through the VPN established through the LTE modem. In addition, the aggregated VPN connection may be encrypted.

In one illustration, a first tunnel is established by using a 3G modem embedded in mobile device 103 and a second tunnel is established by using a LTE USB modem coupled to mobile device 103. Monitoring server 101 sends notification to mobile device 103 through the first tunnel. Mobile device 103 sends monitoring data to monitoring server 101 upon receiving the notification through the second tunnel. Both the first and second tunnels are bonded together to form an aggregated connection.

The scope of the invention is not limited to the aggregated VPN connection having only two VPN tunnels. It may comprise a plurality of VPN tunnels for higher bandwidth and performance.

In one variant, mobile device 103 and monitoring server 101 are connected through an aggregated connection and mobile device 103 is monitored by monitoring server 101. For illustration purpose, the aggregated connection may be formed by aggregating two different VPN tunnels. Monitoring server 101 may send notification 601 or 611 to mobile device 103 through one of the VPN tunnels. Processing unit 1000 may select the VPN tunnel according to the network performance of a VPN tunnel or a policy. For example, processing unit 1000 may select a VPN tunnel which has lighter network traffic loads. Similarly, mobile device 103 may send the monitoring data through one of the VPN tunnels. The use of aggregated connection provides higher reliability and more bandwidth comparing to use of non-aggregated connection. Further, the use of different VPN tunnels by monitoring server 101 and mobile device 103 to transmit notifications and monitoring data respectively may allow more flexibility in choosing different access networks. For example, mobile device 103 may have multiple WAN interfaces that one VPN tunnel is established using a first WAN interface while another VPN tunnel is established using a second WAN interface. Each WAN interface is capable of connecting to a mobile network through a respective RF transceiver. Therefore, mobile device 103 may take advantage of different network performances of VPN tunnels when selecting a VPN tunnel of the aggregated connection to transmit monitoring data. Processing unit 1100 may select a VPN tunnel according to the network performance of a tunnel or a policy. For example, processing unit 1100 may select a VPN tunnel if one of the tunnels is not performing.

FIG. 12 is a flowchart illustrating a process at a network element according to one of the embodiments of the present invention. The network element is capable of taking one or more measurements, such as network performance, temperature, air quality, noise level, humidity, images, videos, audios, fingerprints, smell, location, direction, acceleration, velocity, etc. The network element is also capable of sending the measurements to monitoring server 101 through an interconnected networks 108. The process starts at step 1201. At step 1202, the network element starts taking measurements periodically according to a first measurement taking time interval value and sending the measurement as monitoring data to monitoring server according to a first MTI value at step 1203. The first MTI value may be pre-configured and stored at the network element. Alternatively, the first MTI value may be sent in a notification by monitoring server 101. Preferably, the first MTI value is larger than the first measurement taking time interval value as one transmission of monitoring data should have one or more recent measurements. If the first MTI value is less than the first measurement taking time interval value, the same measurement may be sent twice to monitoring server 101 in two transmissions of monitoring data, and may result in wasting network resources.

At step 1204, network element has detected that an event has occurred and triggered to cause network element to change the frequency of taking measurements and the frequency of sending the measurements to monitoring server 101. The event may be the arrival of a notification sent by monitoring server 101. However, there is no limitation to what the event has to be. For example, the event may be based on time. In another example, the event has occurred after a special compound is detected in the air. When such event occurs, measurements should be taken more frequently and sent to monitoring server 101 more frequently. In one variant, the frequency may be different for different events. If no such event has occurred, the network element will continue to take measurements periodically according to the first measurement taking time interval value and sending the measurement as monitoring data to monitoring server according to a first MTI value.

After the event has been detected, the network element determines whether it is in a bandwidth-saving mode at step 1205. For example, the network element is pre-configured to be in the bandwidth-saving mode and the configuration is stored at a storage medium of the network element. There are myriad of ways for the network element to determine whether it is in a bandwidth-saving mode. In another example, the notification sent by monitoring server 101 may have an instruction to instruct the network element to be in the bandwidth-saving mode or not.

When the network element is in bandwidth-saving mode, the measurement taking time interval value is updated to a third measurement taking time interval value at step 1206 and the MTI value is updated to a third MTI value at step 1207. On the other hand, when the network element is not in bandwidth-saving mode, the measurement taking time interval value is updated to a second measurement taking time interval value at step 1208 and the MTI value is updated to a second MTI value at step 1209. The second MTI value should be less than the third MTI value, such that the network element sends the measurements as monitoring data more frequently to monitoring server 101 when not in bandwidth-saving mode. Further, both the second and third MTI values should be smaller than first MTI value as monitoring data should be sent more frequently after the event has occurred at step 1204.

The second and third measurement taking time interval values and the second and third MTI values may be pre-configured and stored at the network element. In one variant, the values are sent by monitoring server in a notification.

Preferably, for the same reason why the first MTI value is larger than the first measurement taking time interval value, the second MTI value should be larger than the second measurement taking time interval value and the third MTI value should be larger than the third measurement taking time interval value. Both the second and third measurement taking time interval values should be smaller than the first measurement taking time interval value to allow more measurements to be taken in the same period of time. There is no limitation whether the second and third measurement taking time interval values should be same or different.

At step 1210, it is determined whether the measurement taking time interval value and the MTI value are reset to the first measurement taking time interval value and the first MTI value. There may be myriad of reasons why the measurement taking time interval value and the MTI value should be reset. For example, monitoring server 101 sends a notification to the network element to reset after a user has logged off. In another example, an another event may have occurred to cause network element to reset the measurement taking time interval value and the MTI value should be reset. The event may be an intervention of a user. The event may also be caused by a timer.

In one variant, network element may compress measurements taken before sending the measurements as monitoring data to monitoring server 101 in order to save network resources. For example, the measurements taken during a period of ten seconds may consume one mega bytes. Before sending the measurements to monitoring server 101, the network element may compress the measurement. For illustration purpose, the measurements are compressed to one kilo bytes. Then network element sends the one kilo bytes compressed measurements as monitoring data to monitoring server 101.

In one variant, the network element may have a plurality of network interfaces that are capable of connecting to different access networks. Therefore, the network element may send the monitoring data to monitoring server through these different access networks. The benefits of using different access networks include higher reliability and more bandwidth due to load balancing.

BRIEF DESCRIPTION OF DRAWINGS

FIG. 1 illustrates a network environment according to various embodiments of the present invention.

FIG. 2 is a flowchart illustrating a process according to one of the embodiments of the present invention.

FIG. 3A is a flowchart illustrating a process according to one of the embodiments of the present invention.

FIG. 3B is a flowchart illustrating a process according to one of the embodiments of the present invention.

FIG. 3C is a flowchart illustrating a process according to one of the embodiments of the present invention.

FIG. 4 is a flowchart illustrating a process according to one of the embodiments of the present invention.

FIG. 5 is a flowchart illustrating a process according to one of the embodiments of the present invention.

FIG. 6A illustrates the content of a notification according to one of the embodiments of the present invention.

FIG. 6B illustrates the content of a notification according to one of the embodiments of the present invention.

FIG. 7A is a flowchart illustrating a process according to one of the embodiments of the present invention.

FIG. 7B is a flowchart illustrating a process according to one of the embodiments of the present invention.

FIG. 8A illustrates a street map of Palo Alto according to one of the embodiments of the present invention.

FIG. 8B illustrates a street map of Palo Alto according to one of the embodiments of the present invention.

FIG. 8C illustrates a street map of Palo Alto according to one of the embodiments of the present invention.

FIG. 8D illustrates a street map of Palo Alto according to one of the embodiments of the present invention.

FIG. 8E illustrates a street map of Palo Alto according to one of the embodiments of the present invention.

FIG. 9 is a flowchart illustrating a process according to one of the embodiments of the present invention.

FIG. 10 is an illustrative block diagram of a monitoring server according to one of the embodiments of the present invention.

FIG. 11 is an illustrative block diagram of a mobile device according to one of the embodiments of the present invention.

FIG. 12 is a flowchart illustrating a process according to one of the embodiments of the present invention.

The invention claimed is:

1. A method for receiving monitoring data from a network connected device by a monitoring server, comprising the steps of:

(a) sending notifications to the network connected device periodically according to a time interval, wherein the notifications include a request for the monitoring data, wherein the time interval is set to a first value;

wherein the request for the monitoring data comprises a type and nature of data being requested, and is selected from a request for global positioning system (GPS) location of the network connected device, nearby Wi-Fi service set identification (SSID), client list, and information provided by a sensor; wherein the sensor is connected to the network connected device through general-purpose input/output pins or through a local area network (LAN):

(b) receiving the monitoring data from the network connected device; wherein the network connected device taking measurement and sending the monitoring data to the monitoring server periodically at a first time interval;

(c) storing the monitoring data;

(d) changing frequency of performing step (a) when the time interval is changed to a second value;

wherein the time interval is changed to the second value when at least one condition is satisfied; wherein the network connected device taking measurement and sending the monitoring data to the monitoring server periodically at a second time interval;

(e) when an event has occurred: the network connected device determining whether the network connected device is in a bandwidth-saving mode;

(f) if the network connected device is not in a bandwidth-saving mode: the network connected device taking measurements and sending monitoring data to the monitoring server periodically at the second time interval; and (g) if the network connected device is m a bandwidth-saving mode: the network connected device taking measurements and sending monitoring data to the monitoring server periodically at a third time interval; wherein the second time interval is smaller than the third time interval.

2. The method of claim 1, wherein one of the at least one condition is satisfied and the second value is lower than the first value when an authorized user is logged in.

3. The method of claim 1, wherein one of the least one condition is satisfied when an authorized user has chosen to change the first value.

4. The method of claim 1, further comprising displaying images corresponding to the monitoring data at a terminal.

5. The method of claim 1, wherein the monitoring data is chosen from a group consisting of Global Positioning System (GPS) location data, time stamp, data received from general purpose input/output (GPiO) pins of the network connected device, video data, audio data, and image data.

6. The method of claim 1, wherein the notifications comprise authentication information.

7. The method of claim 1, wherein the notifications and the monitoring data are sent through an aggregated connection between the network connected device and the monitoring server.

8. A method for receiving monitoring data from a network connected device by a monitoring server, comprising the steps of:

(a) sending a notification to the network connected device, wherein the notification includes a request for the monitoring data and a time interval value;

(b) receiving the monitoring data from the network connected device; wherein the network connected device taking measurement and sending the monitoring data to the monitoring server periodically at a first time interval;

(c) storing the monitoring data;

(d) sending a new notification to the network connected device when the time interval is changed to a second value; wherein the time interval is changed to the second value when at least one condition is satisfied; wherein the network connected device taking measurement and sending the monitoring data to the monitoring server periodically at a second time interval;

(e) when an event has occurred: the network connected device determining whether the network connected device is in a bandwidth-saving mode: wherein the event occurs after the network connected device receives the new notification from the monitoring server;

(f) if the network connected device is not in a bandwidth-saving mode: the network connected device taking measurements and sending monitoring data to the monitoring server periodically at the second time interval; and (g) if the network connected device is in a bandwidth-saving mode: the network connected device taking measurements and sending monitoring data to the monitoring server periodically at a third time interval; wherein the second time interval is smaller than the third time interval.

9. The method of claim 8, wherein further comprising sending information corresponding to the monitoring data to a terminal for displaying.

10. The method of claim 8, wherein the new notification includes an instruction, wherein the instruction is for instructing the network connected device to cease to send monitoring data to the monitoring server.

11. A system for monitoring a network connected device, the system comprising:

a monitoring server; and a network connected device;

wherein the monitoring server comprises:

at least one first network interface;

at least one first main memory;

at least one first processing unit;

at least one first storage unit storing program instructions executable by the at least one first processing unit for:

(a) sending a notification to the network connected device, wherein the notification includes a request for the monitoring data and a time interval value; wherein the request for the monitoring data comprises a type and nature of data being requested, and is selected from a request for global positioning system (GPS) location of the network connected device, nearby Wi-Fi service set identification (SSID), client list, and information provided by a sensor; wherein the sensor is connected to the network connected device through general-purpose input/output pins or through a local area network (LAN);

(b) receiving the monitoring data from the network connected device;

(c) storing the monitoring data;

(d) sending a new notification to the network connected device when the time interval is changed to a second-value; wherein the time interval is changed to the second value when at least one condition is satisfied;

wherein the network connected device comprises:

at least one second network interface;

at least one second main memory;

at least one second processing unit; and at least one second secondary storage storing program instructions executable by the at least one second processing unit for:

(e) receiving the notification from the monitoring server;

(f) taking measurement and sending the monitoring data to the monitoring server periodically at a first time interval according to the time interval value; and (g) taking measurement and sending the monitoring data to the monitoring server periodically at a second time interval after receiving the new notification;

(h) when an event has occurred: determining whether the network connected device is in a bandwidth-saving mode;

(i) if the network connected device is not in a bandwidth-saving node: taking measurements and sending monitoring data to the monitoring server periodically at the second time interval; and (j) if the network connected device is in a bandwidth-saving mode: the network connected device taking measurements and sending monitoring data to the monitoring server periodically at a third time interval wherein the second time Interval is smaller than the third time interval.

12. The system of claim 11, wherein one of the least one condition is satisfied and the second value is lower than the first value when an authorized user is logged in.

13. The system of claim 11, wherein one of the least one condition is satisfied when an authorized user has chosen to change the first value.

14. The system of claim 11, wherein the monitoring data is substantially based on measurements taken by the network connected device periodically.

15. The system of claim 11, wherein the monitoring data is chosen from a group consisting of Global Positioning System (GPS) location data, time stamp, data received from general purpose input/output (GPIO) pins of the network connected device, video data, audio data, and image data.

16. The system of claim 11, wherein the notification and the new notification comprise authentication information.

17. The system of claim 11, wherein the notification, the new notification and the monitoring data are sent through an aggregated connection between the network connected device and the monitoring server.

18. The system of claim 17, wherein the notification and the new notification are sent through a first tunnel and the monitoring data are sent through a second tunnel, where the first tunnel and the second tunnel are part of the aggregated connection.

19. The system of claim 11, wherein the at least one first storage unit further storing program instructions executable by the at least one first processing unit for sending information corresponding to the monitoring data to a terminal for displaying.

20. The system of claim 11, wherein the new notification includes an instruction, wherein the instruction is for instructing the network connected device to cease to send monitoring data to the monitoring server.

* * * * *